(12) United States Patent
Dugad et al.

(10) Patent No.: US 7,382,755 B2
(45) Date of Patent: Jun. 3, 2008

(54) METHOD TO CONVEY UPLINK TRAFFIC INFORMATION

(75) Inventors: Rakesh Dugad, Jersey City, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 10/678,759

(22) Filed: Oct. 2, 2003

(65) Prior Publication Data
US 2004/0127226 A1 Jul. 1, 2004

Related U.S. Application Data

(60) Provisional application No. 60/415,787, filed on Oct. 3, 2002.

(51) Int. Cl.
*H04J 3/00* (2006.01)
*H04B 7/212* (2006.01)
*H04L 12/56* (2006.01)
*H04J 3/16* (2006.01)

(52) U.S. Cl. ............... 370/337; 370/347; 370/412; 370/468

(58) Field of Classification Search ........... 370/337, 370/230, 347, 412, 468, 450, 452.2, 348, 370/230.1, 235, 236, 321, 310.2, 329, 330, 370/338, 341
See application file for complete search history.

(56) References Cited

U.S. PATENT DOCUMENTS

| | | | |
|---|---|---|---|
| 5,140,584 A | 8/1992 | Suzuki | 370/235 |
| 5,515,379 A | 5/1996 | Crisler et al. | 370/347 |
| 5,752,193 A | 5/1998 | Scholefield et al. | 455/452.2 |
| 6,185,221 B1 | 2/2001 | Aybay | 370/412 |
| 6,198,728 B1 | 3/2001 | Hulyalkar et al. | 370/310.1 |
| 6,438,135 B1* | 8/2002 | Tzeng | 370/412 |
| 6,747,971 B1* | 6/2004 | Hughes et al. | 370/387 |
| 6,868,087 B1* | 3/2005 | Agarwala et al. | 370/412 |
| 6,980,540 B1* | 12/2005 | Laroia et al. | 370/345 |
| 7,002,929 B2* | 2/2006 | Struhsaker et al. | 370/280 |

(Continued)

OTHER PUBLICATIONS

PCT International Search Report for International Application No. PCT/US03/31729, filed on Oct. 2, 2003.

*Primary Examiner*—Firmin Backer
*Assistant Examiner*—Farah Faroul
(74) *Attorney, Agent, or Firm*—Straub & Pokotylo; Michael P. Straub; Ronald P. Straub

(57) ABSTRACT

Methods and apparatus for a Wireless Terminal (WT) to convey uplink traffic information, e.g., uplink channel resource requests, to a Base Station (BS) are described. Uplink transmission resources are requested for data corresponding to different priority levels. The WT keeps track of the BS's understanding of WT traffic through the use of a first queue which keeps track of the BS's estimate of WT's uplink queue status for different priority levels by following the same procedure the BS uses to update its estimate of WT queue status. The WT uses this tracked information along with actual traffic information it maintains in a second set of queue information to form uplink traffic channel requests to be transmitted to the BS. Methods used by the BS to interpret uplink traffic channel requests from WTs are also described. The BS maintains its own queue of requests and corresponding priority information for individual WTs.

52 Claims, 22 Drawing Sheets

U.S. PATENT DOCUMENTS

| | | |
|---|---|---|
| 7,006,530 B2 * | 2/2006 | Spinar et al. ................ 370/468 |
| 7,286,830 B2 * | 10/2007 | Gaal et al. ................ 455/452.1 |
| 2003/0016649 A1 * | 1/2003 | Connors ..................... 370/347 |
| 2004/0017825 A1 * | 1/2004 | Stanwood et al. .......... 370/468 |

* cited by examiner

2300

2301 2302 2304 2306

| 5 bit request | Priority | n at MS | n at BS | Comment |
|---|---|---|---|---|
| 0 | X | X | X | Not used for uplink request |
| 1 | X | X | X | Not used for uplink request |
| 2 | X | X | X | Not used for uplink request |
| 3 | 3 | $n=0$ | $n=0$ | |
| 4 | 1 | $n=1$ | $n=1$ | |
| 5 | 1 | $n=2$ | $n=2$ | |
| 6 | 1 | $n=3$ | $n=3$ | |
| 7 | 1 | $n>=4$ | $n=4$ | |
| 8 | 0 | $n=1$ | $n=1$ | |
| 9 | 0 | $n=2$ | $n=1$ | |
| 10 | 0 | $n=3$ | $n=1$ | |
| 11 | 0 | $n=4$ | $n=1$ | |
| 12 | 0 | $n=5$ | $n=1$ | |
| 13 | 0 | $n=6$ | $n=1$ | |
| 14 | 0 | $n=7$ | $n=1$ | |
| 15 | 0 | $n>=8$ | $n=1$ | |
| 16 | 2 | $thre[0] <=n < thre[1]$ | $n=thre[0]$ | |
| 17 | 2 | $thre[1] <=n < thre[2]$ | $n=thre[1]$ | |
| 18 | 2 | $thre[2] <=n < thre[3]$ | $n=thre[2]$ | |
| 19 | 2 | $thre[3] <=n < thre[4]$ | $n=thre[3]$ | |
| 20 | 2 | $thre[4] <=n < thre[5]$ | $n=thre[4]$ | |
| 21 | 2 | $thre[5] <=n < thre[6]$ | $n=thre[5]$ | |
| 22 | 2 | $thre[6] <=n < thre[7]$ | $n=thre[6]$ | |
| 23 | 2 | $thre[7] <=n$ | $n=thre[7]$ | |
| 24 | 3 | $thre[0] <=n < thre[1]$ | $n=thre[0]$ | |
| 25 | 3 | $thre[1] <=n < thre[2]$ | $n=thre[1]$ | |
| 26 | 3 | $thre[2] <=n < thre[3]$ | $n=thre[2]$ | |
| 27 | 3 | $thre[3] <=n < thre[4]$ | $n=thre[3]$ | |
| 28 | 3 | $thre[4] <=n < thre[5]$ | $n=thre[4]$ | |
| 29 | 3 | $thre[5] <=n < thre[6]$ | $n=thre[5]$ | |
| 30 | 3 | $thre[6] <=n < thre[7]$ | $n=thre[6]$ | |
| 31 | 3 | $thre[7] <=n$ | $n=thre[7]$ | |

FIG. 23

METHOD TO CONVEY UPLINK TRAFFIC INFORMATION

RELATED APPLICATIONS

The present application claims the benefit of U.S. Provisional Patent Application Ser. No. 60/415,787 filed Oct. 3, 2002 which is hereby expressly incorporated by reference.

FIELD OF THE INVENTION

The present invention relates to communications systems and, more particularly, methods and apparatus to generate and convey uplink traffic information, e.g. requests and assignments for uplink air link resources, between wireless terminals and a base station in a cellular communications network.

BACKGROUND

In a cellular wireless system, a service area is divided into a number of coverage zones generally referred to as cells. Each cell may represent the wireless coverage area for a base station. Wireless terminals, including a wide range of mobile devices such as, e.g., cell phones and other mobile transmitters such as personal data assistants with wireless modems, may communicate with the base station via wireless links while located within the base station's cell. Multiple wireless terminals need to transmit different types of information with different priorities to the base station, e.g. various types of uplink traffic information, over the air link resources. The uplink air link resource may be defined as available bandwidth over time. The bandwidth is centrally controlled by the base station to avoid collisions between multiple wireless terminals who may wish to transmit at the same time. Each wireless terminal has an idea of its own current uplink traffic requirements, e.g., bandwidth over time required, quality of service required, priority level required for the information to be transmitted, time constraints on information to be transmitted, etc. The wireless terminals' uplink traffic requirements need to be conveyed to the base station, so that the base station can make informed decisions to assign uplink air link resources, schedule users, and send assignment messages notifying the wireless terminals of the choice that have been made.

Many known systems use a circuit switch approach to convey this exchange of uplink traffic information. In the circuit switched approach, the wireless terminal and base station typically exchange information over a control channel with a low bandwidth and a low bit rate, the exchange involves conveying requirements and requests from the wireless terminal to the base station, the negotiation of the amount of air link resource that can be allocated, and the assignment of the air link resource to the wireless terminal. Each transaction is generally slow and will require more than a few bits. This circuit switch approach typically will work well where the exchange can take place once at the beginning of a session, and the air link resource can be assigned for long intervals of time (e.g. 10 sec or 1 sec). In this approach you establish a link for an extended period of time and may send a message at the end of a session to relinquish the resource. Intervals of unused transmission time between the establishment of the link and the termination of the link represents wasted air link resources. This circuit switch approach ties up the air link resource for extended periods of time. With packet switch wireless systems, e.g. an OFDM system, this circuit switch approach is inefficient, as the wireless terminal generally do not need the air link resource for long contiguous segments, but rather need short durations, e.g., flash intervals. In addition, it is inefficient, in packet switch systems to be constantly have to renegotiate for a small amount of air link resource, as the overhead signaling becomes significant in relation to the amount of air link resource actually used for traffic.

Other more efficient approaches are possible which are better suited for packet type wireless communications systems, where each wireless terminal has a dedicated uplink channel with a dedicated amount of a air link resources for making uplink traffic requests at pre-determined times coordinated with the base station, and the base station makes assignments. This approach has a delay effect problem. There is a delay between when the wireless terminal transmits a request for uplink air link resources, and the time that a base station receives and processes the request. There is also a delay between the time when the base station generates and transmits the assignment and the wireless terminal receives and recognizes the assignment. These delays create misunderstandings between the base station and the wireless terminal resulting in wasted air link resources, unnecessary additional requests, and unnecessary additional assignments.

This problem of lack of understanding between the base station and wireless terminal becomes more complicated and new problems are created when multiple levels of priorities are considered. Assume that a wireless terminal needs a high levels of resources at a low priority level, e.g. a priority level associated with data, and needs low levels of resources at a high priority level, e.g., a priority level associated with voice. Depending on the timing, it is possible, that the low priority request information will be blocked indefinitely.

Certain information may be timing sensitive, e.g., if the request is not granted with an assignment within a specified time interval, the need for the request may go away. It is inefficient to transmit that requested data units are no longer needed. This dropping of requested data units unbeknown to the base station can result in misunderstanding and unnecessary wasted assignments by the base station. Also, some requests may be lost due to transmission errors, and there are trade-offs between whether to transmit another request immediately or whether to wait, since the wireless terminal does not know whether the base station never received the request or has not transmitted the assignment because of other higher priorities competing for the air link resource.

The needs and priorities within the wireless terminal can change between the request and reception of an assignment message allocating data units. Therefore, the wireless terminal may reallocate to a new priority level received air link resources that were originally intended for different (original) priorities when assigned by the base station. This can also result in misunderstandings between the base station and the wireless terminal.

In view of the above discussion, it should be appreciated that there is a need for improved methods of keeping track of air link resource requests in the case where the requests may correspond to multiple priority levels particularly in the context of signaling delays and potential loss of some transmitted requests and/or assignments. In particular there is a need for an understanding in the base station as to the wireless terminal uplink traffic needs and priorities, a need to maintain an understanding of the base station uplink traffic assignments in the wireless terminals, and/or a need for a methods and apparatus for conveying request information in a fast, efficient and timely manner utilizing a small number of bits so as to keep overhead low. There are also needs for methods that employ flexibility in allocating resources based on requests of various levels of priorities. Such methods should address the different problems presented by different priority users, as well as address concerns presented by lost request and assignment transmissions, and dynamic changes in needs at a wireless terminal. In the case of wireless terminals, there is a need for a method of maintaining an understanding of a base station's perception of a mobile's needs so that the mobile can effectively and efficiently update the base station's understanding in a timely manner.

BRIEF DESCRIPTION OF THE FIGURES

FIG. 23 shows a table suitable for use as a mapping table when forming uplink assignment requests at the wireless terminal and interpreting such requests at the base station, in accordance with the present invention.

SUMMARY OF INVENTION

Figure 1:
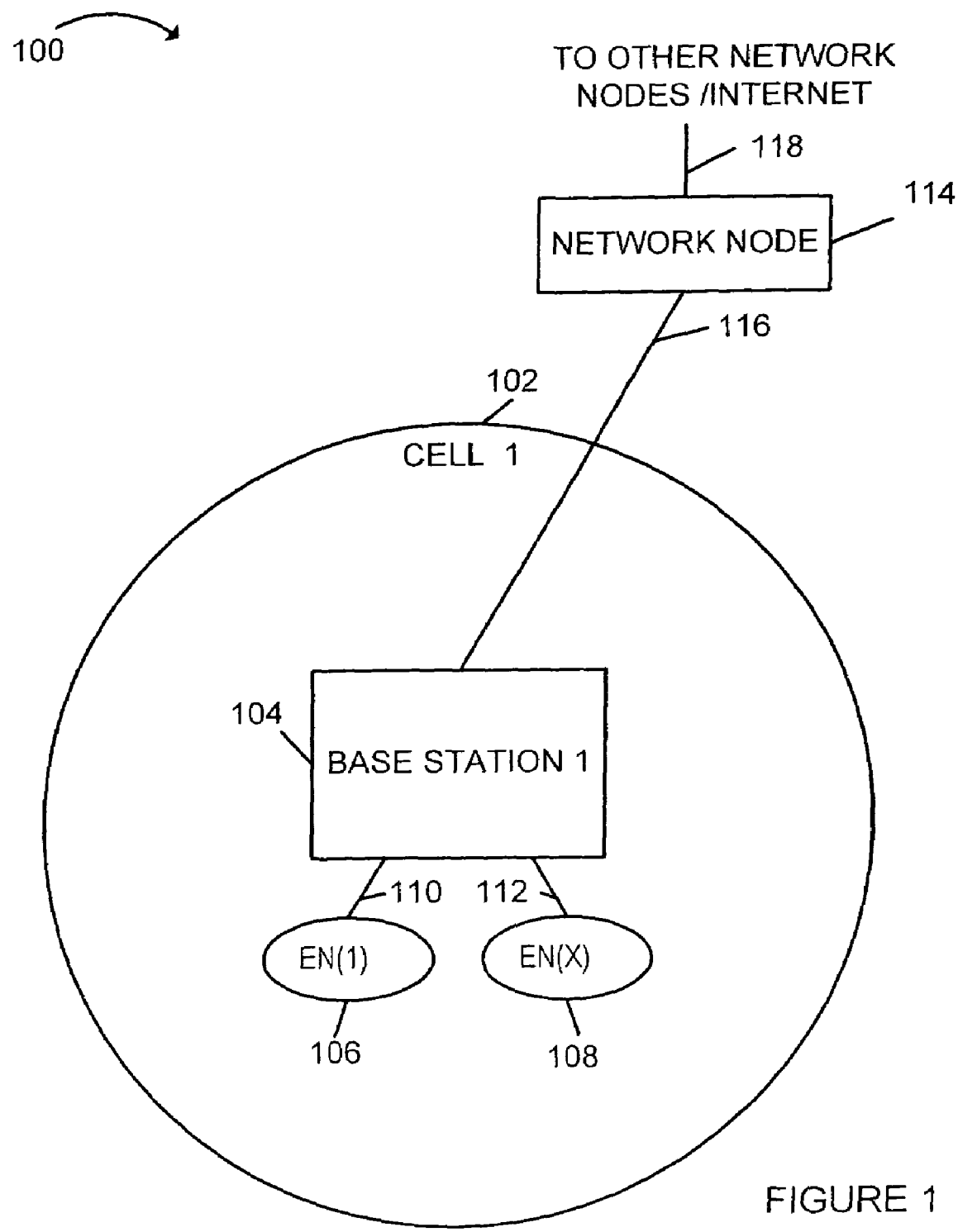
FIG. 1 illustrates an exemplary communication system implemented in accordance with the invention.

The present invention is directed to methods and apparatus for making traffic channel resource allocation requests. Requests may include information such as the number of transmission units required and/or the priority level of data to be transmitted using the requested units. Requests may be of several types. Requests of different types are arranged in groups in some embodiments. Incremental, e.g., relative requests may be made within a group of request. However, groups of requests are interpreted in many embodiments independently, with absolute request values being used to reduce the propagation of errors in tracking request status from one group of requests to the next. Groups of requests including multiple requests may be transmitted on a periodic basis or according to some pre-selected schedule. In some embodiments, groups of requests are transmitted in time periods under 98 milli seconds (ms) in duration to ensure accurately and timely uplink status information.

In accordance with the invention, the requests transmitted in each group of requests (GOR) over time by a wireless terminal (WT), e.g., mobile node, end node or mobile station, can be interpreted by the receiving base station (BS) without knowledge of the requests made in another GOR. Within each GOR, in one exemplary embodiment, the BS can interpret the request made in the first (0th) request unit by itself. This is because the first request in each group of requests is transmitted in the exemplary embodiment as an absolute value which does not depend on previously transmitted requests. Subsequent requests in the group of requests may be transmitted as relative values, e.g., values which are to be interpreted as a function of some previously transmitted request value and/or as a function of assignment information which corresponds to grants of previous requests. A relative request value may be, e.g., a request for an incremental number of transmission data units corresponding to the priority level associated with the associated request. In the exemplary embodiment, the first time data units corresponding to a particular priority level are requested, the request is made using an absolute value. In some, but not all implementations, subsequent requests made for transmission units of the same priority level in the same GOR are communicated using relative values. In some implementations the number of relative request values in a GOR is more than the number of absolute request values thereby leading to efficient use of the limited request communications resource. The start of each GOR allows the BS to updates its counters, e.g., queue information, using absolute values and thereby correct for various errors which may accumulate due to the use of relative request values and/or the failure to receive all transmitted requests. All BS counters need not be reset at the start of each GOR. Thus, in the case of relative requests, the relative request values included in such requests are normally interpreted by the BS based on one or more of the requests made in preceding request units of the same group of requests.

In the exemplary embodiment, in accordance with the invention, the WT keeps track of the BS's understanding of the WTs transmission queues used to transmit data, e.g., frames, corresponding to different priority levels. Voice may correspond to a first priority level with text data corresponding to a different, e.g., lower, priority level. Queue information is referred to herein as Q-stats. Let the WT's actual Q-stats be denoted, for purposes of explaining the invention by msQ. Let the BS's understanding of the WT Q-stats be denoted for purpose of explaining the same examples by bsQ. Let the WT's understanding of bsQ be denoted by msBsQ. In the flow charts and much of the following discussion of various examples, we use PQ for bsQ, MPQ for msQ, and BPQ for msBsQ. In some embodiments of the invention, the msBsQ is not used.

In some embodiments, requests are formed based on the WT's actual Q-stats msQ. In addition to being based on msQ, a request can also be based on msBsQ, and/or preceding requests in the same group of requests. Relative request values are generated in this manner in some embodiments. Periodically and/or frequently requests are formed without basing them on msBsQ. The values used in such requests are normally absolute values, e.g., values which indicate a full actual count of the number of transmission data units desired for a particular priority level as opposed to an incremental number of desired data units, the number of data units desired beyond the number already requested. The use of absolute values facilitates quick synchronization between WT and BS understanding of Q-stats in case of the loss of requests or assignments due to channel errors.

In one particular embodiment, the request conveying information about a stream priority group for the first time (within a GOR) is formed without basing it on msBsQ, e.g., it is transmitted as an absolute value. In some embodiments, the WT uses a mapping table, e.g., a quantization table, to map the number of data units, e.g., frames at various stream priorities to be requested, to the limited number of bits allowed for a request. In various implementations, different quantization tables are used when generating requests which use absolute values than requests which use relative values to convey transmission unit requirement information.

In accordance with a WT processing feature of the invention, the WT maintains two sets of queue information. Upon making each request, and upon receiving each assignment, the WT updates its set of queue information (msBsQ) estimating the BS's understanding of WT Q-stats. This update is done by logically following the same procedure as the BS uses to update a set of queue information bsQ representing the BS's understanding of the WTs queue status upon receiving a request or upon making an assignment. Upon receiving an assignment, this involves subtracting frames from the appropriate stream priorities in msBsQ. In one embodiment, frames are subtracted in order of decreasing significance of the stream priorities (i.e., the highest stream priority is assumed to be served first with lower priority streams then being served in the WT in order of their priority). Upon making a request, the WT computes the number of data units, e.g., frames of each priority to be requested, e.g., by using the same mapping, e.g., quantization table, that the BS uses to interpret the request. Then depending on whether the request includes an absolute value, e.g., based only on the msQ which indicates the actual number of transmission units required for various priority levels, or relative value, e.g., a value generated based on comparing msQ with msBsQ, the msBsQ is updated. In one embodiment, for the case of absolute requests, this involves replacing transmission data unit (e.g., frame) counts in the msBsQ with those reported in the request for the corresponding stream priorities reported in the request. In one embodiment, for the case of relative request, this involves adding the requested frames to msBsQ for the corresponding stream priorities reported in the request. Note that it is possible that a request include an absolute value for some stream priorities, and a relative for some other stream priorities.

Tracking bsQ at the WT (through the variable msBsQ at WT), and the ability to be able to report WT's traffic information (msQ) relative to msBsQ, gives the WT great flexibility in constructing uplink requests. In one embodiment, after reporting absolute traffic information about priority group A in one request, in the next request the WT can decide to report absolute traffic information about another priority group B instead of reporting relative traffic information about priority group A. Such flexibility may not available in a scheme where WT reports its absolute traffic information or its quantized version (based on msQ) without recourse to msBsQ. In another embodiment, the WT can split reporting of traffic information about a priority group into multiple requests in a way that adds robustness to the requests against channel errors. For example, 15 frames of priority group 3 can be reported as 8 frames in one request and 7 frames in the next request (instead of say 12 frames in one request and 3 frames in next request, or simply 15 frames in one request). This way, if the first request is lost the second can still provide a good idea of MS's traffic information. Again, this may not be possible with a scheme based solely on reporting absolute traffic information or its quantized version.

In accordance with various embodiments of the invention, each request may convey partial information about msQ with the BS acquiring successively more information regarding msQ as more requests within the same group are received.

In one embodiment, each request carries information regarding non-zero number of frames of at most one stream priority group. In general, and in some other embodiments, each request can carry information regarding more than one stream priority group.

In some embodiments, a request can carry information regarding non-zero count (or its quantized version) of frames of a single stream priority, where this stream priority need not be the highest stream with non-zero frames. The count reported in such a case is an absolute count of the number of frames. Here, the WT has great flexibility in picking the priority that it chooses to report.

In one embodiment, groups of requests each include a single request. Thus, the dedicated resource for conveying the uplink traffic requests is partitioned into units where each unit represents a separate opportunity for the WT to convey its uplink traffic information, e.g., request transmission units for uplink traffic. In one such implementation each request is formed without regard to previous requests, e.g., absolute values are used for the number of traffic data transmission units being requested. Thus, each request carries absolute traffic information or a quantized absolute value representing a courser version of actual number of data units required. In some embodiments of this type, each request carries information about non-zero frames of at most one stream priority group where the stream priority group corresponds to the most significant stream priority that has non-zero frames. In other cases, to be fair to lower priority groups, some pattern of requests may be predetermined or controlled by the WT, e.g., as a function of an arbitration routine, so that higher priority requests to do not repeatedly preclude lower priority requests which may be for far larger numbers of transmission units but of a less time critical nature than the higher priority requests.

The apparatus and methods of the present invention may be implemented using hardware, software or a combination of hardware and software.

Numerous additional features, benefits and advantages of the present invention will be apparent from the detailed description which follows.

DETAILED DESCRIPTION OF INVENTION

FIG. 1 shows an exemplary communication system 100 implemented in accordance with the present invention which includes a plurality of cells, such as cell 1 102 which is shown.

Cell 1 102 includes a base station (BS), base station 1 104, and a plurality of wireless terminals, e.g., end nodes (ENs), EN(1) 106 and EN(X) 108. EN(1) 106 and EN(X) 108 are coupled to BS1 104 via wireless links 110, 112, respectively. System 100 also includes a network node 114 which is coupled to BS1 104 via network link 116. Network node 114 is also coupled to other network nodes, e.g., other base stations, AAA server nodes, intermediate nodes, routers, etc. and the Internet via network link 118. Network links 116, 118 may be, e.g., fiber optic cables. Each end node, e.g. EN(1) 106, may be a wireless terminal including a transmitter as well as a receiver. The wireless terminals, e.g., EN(1) 166, may move through system 100 and may communicate via wireless links with the base station in the cell in which the EN is currently located. The wireless terminals, (WTs), e.g. EN(1) 136, may communicate with peer nodes, e.g., other WTs in system 100 or outside system 100 via a base station, e.g. BS 1104, and/or network node 118. WTs, e.g., EN(1) 106 may be mobile communications devices such as cell phones, personal data assistants with wireless modems, etc. and may be referred to as mobile node (MNs).

Figure 2:
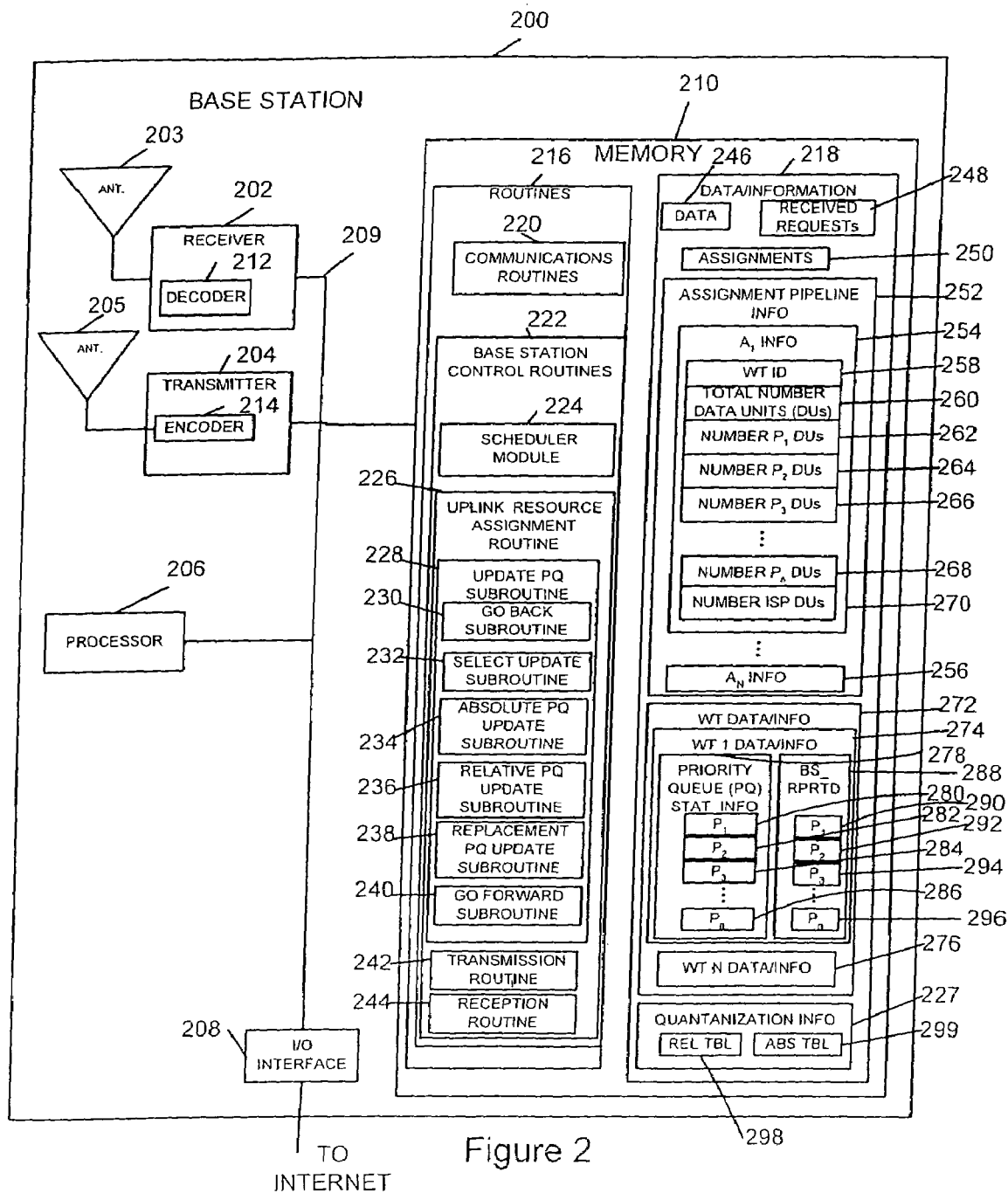
FIG. 2 illustrates an exemplary base station, suitable for use in the system of FIG. 1, implemented in accordance with the present invention.

FIG. 2 illustrates an exemplary base station 200 implemented in accordance with the present invention. Exemplary base station 200 implements the uplink traffic information method of the present invention. The base station 200 may be used as any one of the base stations 104 of the system 100 of FIG. 1. The base station 200 includes a receiver 202 including a decoder 212, a transmitter 204 including an encoder 214, a processor, e.g., CPU 206, an input/output interface 208, and a memory 210 which are coupled together by a bus 209 over which the various elements 202, 204, 206, 208, and 210 may interchange data and information.

Antenna 203 coupled to receiver 202 is used for receiving data and other signals, e.g., uplink traffic channel requests, from wireless terminals 300 (see FIG. 3), within the cell 102 in which the base station 200 is located. Antenna 205 coupled to transmitter 204 is used for transmitting data and other signals, e.g., assignments for uplink traffic channels to wireless terminals 300 within the base station's cell 102. The processor 206, may be, e.g., a general purpose central processing unit (CPU). Memory 210 includes routines 216 and data/information 218. Processor 206 controls operation of the base station 200 under direction of one or more routines 216 stored in memory 210 and using data/information 218 implements the methods of the present invention. I/O interface 208 provides a connection to other network nodes, coupling the BS 200 to other base stations, access routers, AAA server nodes, etc., other networks, and the Internet.

Data/information 218 includes data 246, received requests 248, assignments 250, assignment pipeline information 252, wireless terminal data/information 272, and quantization information 297.

Routines 216 include communications routines 220 and base station control routines 222. Base station control routines 222 includes a scheduler module 224, an uplink resource assignment routine 226, a transmission routine 242, and a reception routine 244. The uplink resource assignment routine 226 includes an update priority queue (PQ) subroutine 228 including a go back subroutine 228, a select update subroutine 232, an absolute PQ update subroutine 234, a relative PQ update subroutine 236, a replacement PQ update subroutine 238, and a go forward subroutine 240.

Data 246 may include data/information to be processed by encoder 214 and transmitted on downlink channels by transmitter 204 to a plurality of WTs 300 and the received data/information transmitted from WTs 300 on uplink traffic channels that has been processed through decoder 212 of receiver 202 following reception.

Received requests 248 includes received uplink traffic channel requests for air link resources, e.g., bandwidth over time, by wireless terminals 300. Received requests 248 may include received raw requests which may have been encoded in accordance with the invention, by the WT 300, prior to transmission, to include both priority and quantized requests for numbers of data units, e.g., uplink air link transmission resources. Received requests 248 includes messages conveying single or multiple priority information, messages conveying data unit request information at various priority levels, messages with different structures at different times, e.g., using different quantization schemes, e.g., 6 bits vs 2 bits, and messages conveying different types of information, e.g. absolute, relative, or replacement information. Received requests 248 may also include processed received requests in which the priority and quantized request information has been decoded and extracted from the raw received request, and associated with a specific WT identified by a base station assigned ID.

Assignments 250 may include uplink traffic channel assignment information for the WT 300 being serviced by BS 200. Assignment pipeline information 252 is a circular array of assignment vectors. A pointer keeps note of the current position in the assignment pipeline (AP) 252; the pointer moves forward, in circular fashion every slot as the BS 200 makes assignments and records the assignments in the assignment pipeline 252. AP info 252 includes N assignment vectors, $A_1$ info 254, $A_N$ INFO 256. Each assignment vector, e.g. A1 info 254 includes a record of the assignment including a WT ID 258, a number of data units (DUs) allocated at each of the priority levels $P_1$ through $P_n$: number $P_1$ DUs 262, number of $P_2$ DUs 264, number of $P_3$ DUs 266, number of $P_n$ DUs 268, and a number of invalid_stream_priority (ISP) DUs 270.

In some embodiments, it is possible that the record for each of the assignment vector include the ms id, and the total number of data units assigned in that assignment without the need for other information.

Various alternative structures to AP252 are possible in accordance with the invention. One alternative structure to AP 252 has for each assignment vector, e.g., A1 254, an entry for WT ID 258, an entry for the total number of data units assigned, and an entry for each data unit assigned recording the priority level of the assigned data unit. Another alternative structure to AP 252 would be to keep one assignment pipeline per WT 300; in this case, each entry in AP 252 would be a vector indicating data units allocated to various priorities, where a vector with each of its elements equal to 0 would indicate that no assignment was made to the wireless terminal 300.

Wireless terminal data/info 272 includes a plurality of WT 300 sets of information, WT 1 data/info 274, WT N data/info 276. Each WT set of information, e.g, WT 1 data/info 274 includes a set of priority queue (PQ) stat information 278 and a set of base station flags for each priority level, bs_reported 288. PQ stat info 278 includes n elements, one element for each of the n priorities. Each element in PQ stat info 278, PQ(P$_1$) 280, PQ(P$_2$) 282, PQ(P$_3$) 284, PQ(P$_n$) 286 includes a number representing the BS's 200 understanding of the WT 300 outstanding uplink traffic channel data units at that specific priority level as inferred from uplink requests from the WT. Bs_reported 288 includes n elements, one element for each of the n priorities, and each element representing a flag. Each element bs_reported(P1) 290, bs_reported(P2) 292, bs_reported(P3) 294, bs_reported(Pn) keeps track of priorities reported for the WT 300 in an uplink traffic channel current group of requests (GOR) from the WT 300.

Quantization information 297 includes information for decoding encoded uplink traffic requests, which include priority and numbers of requested data units, from the WT 300. Quantization information 297 may include formulas and/or tables known to both BS 200 and WT 300. Multiple quantization tables, e.g., a relative request quantization table 298 and an absolute request quantization table 299, may be used in some embodiments, based on, e.g., number of bits used in the encoding and/or type of request. When multiple quantization tables are used, a pre-determined understanding may exist between BS 200 and WT 300 so as to correlate a received request to the appropriate quantization table.

Communications routines 222 control the base station 200 to perform various communications operations and implement various communications protocols.

Base station control routines 224 are used to control the base station 200 to perform basic base station functional tasks, e.g., signal generation and reception including the tone hopping and error correcting coding processing, scheduling of downlink and uplink channels segments to WTs 300, and to implement of the steps of the method of the present invention including the reception and processing of uplink traffic channel requests from WTs 300 and the generation and transmission of uplink traffic channel assignments in accordance with the present invention.

Scheduler module 226 allocates downlink and uplink channel segments to the WTs 300 within its cell 102, including uplink traffic channel segments. Each channel segment includes one or more logical tones for a determined duration of time. Uplink resource assignment routine 226 using the data/info 218 monitors for uplink traffic channel requests, processes received requests 248 updates WT PQ info 278, makes assignments 250, and updates the assignment pipeline 252, in accordance with the methods of the present invention. Update PQ subroutine 228 is called to process a received request, and incorporates the information in the request into the base station's PQ stat info 278 for the WT 300. Go back subroutine 230, when called by PQ subroutine 228 integrates recent pipeline assignment information 252 into the BS 200 PQ stats 278 for the WT 300. The select update subroutine 232 uses a pre-determined method, known and agreed upon by BS 200 and WT 300, to identify the request type, e.g. absolute, relative, or replacement, and to direct flow to the corresponding subroutine 234, 236, 238. One exemplary method that may be used by the select update subroutine 232 is to pre-define the type of requests with respect to position in a group of requests, e.g., first request in GOR is an absolute request and subsequent requests in the GOP are relative requests. Absolute PQ update subroutine 234, when called by update PQ subroutine 228 decodes a received request 248, and performs an update of the BS PQ stats 278 for WT 300 by incorporating priority and count information included in the request 248 into the PQ stats 278. Relative PQ update subroutine 236, when called by update PQ subroutine 228 decodes a received request 248, and performs an update of the BS PQ stats 278 for WT 300 by incorporating priority and count information included in the request 248 into the PQ stats 278. Replacement PQ update subroutine 236, when called by update PQ subroutine 228 decodes a received request 248, and performs an update of the BS PQ stats 278 for WT 300 by incorporating priority and count information included in the request 248 into the PQ stats 278. Go forward subroutine 240, when called by PQ subroutine 228 removes recent pipeline assignment information 252 into the BS 200 PQ stats 278 for the WT 300, and overwrites an entry in circular pipeline 252 with new assignment information for the assignment being processed. Base station subroutines 228, 230, 232, 234, 236, 238, and 240 implement the methods of the present invention.

Transmission routine 242 controls the transmitter 204 to transmit information including uplink traffic channel assignments 250 to WTs 300. Reception routine 244 controls the receiver 202 to receive signaling including uplink traffic channel requests from WTs 300.

Figure 3:
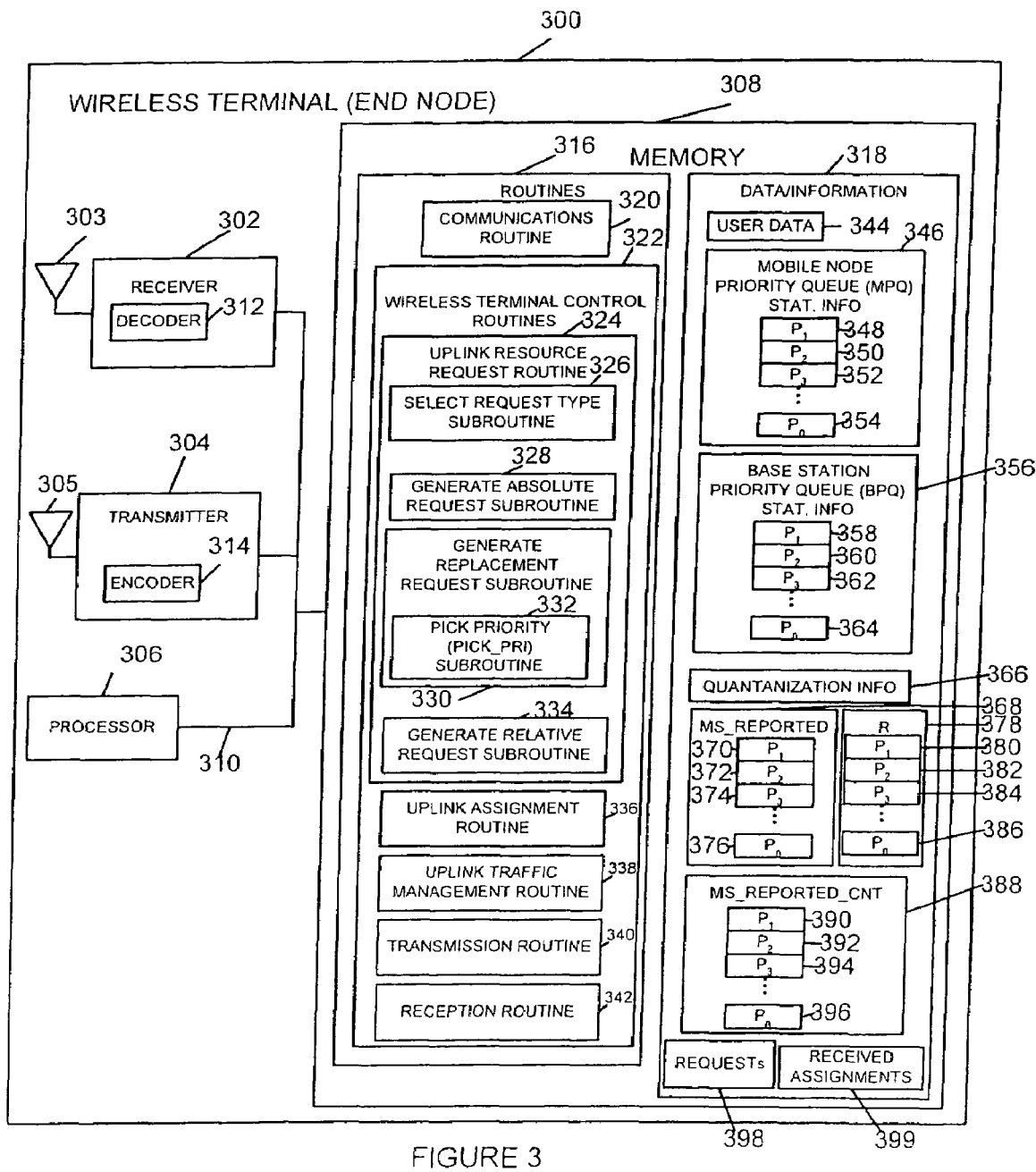
FIG. 3 illustrates an exemplary wireless terminal, suitable for use in the system of FIG. 1, implemented in accordance with the present invention.

FIG. 3 illustrates an exemplary wireless terminal (end node) 300 which can be used as any one of the wireless terminals (end nodes), e.g. EN(1) 106, of the system 100 shown in FIG. 1. Wireless terminal (WT) 300 may also be referred to as a Mobile Node (MN) in this application. Wireless terminal 300 is implemented in accordance with the uplink traffic channel methods of the present invention. The wireless terminal 300 includes a receiver 302 including a decoder 312, a transmitter 304 including an encoder 314, a processor 306, and memory 308 which are coupled together by a bus 310 over which the various elements 302, 304, 306, 308 can interchange data and information. An antenna 303 used for receiving signals from a base station 200 is coupled to receiver 302. An antenna 305 used for transmitting signals, e.g., to base station 200 is coupled to transmitter 304.

The processor 306 controls the operation of the wireless terminal 300 by executing routines 316 and using data/information 318 in memory 308.

Data/information 318 includes user data 334, mobile node priority queue (MPQ) stat information 346, base station priority queue (BPQ) stat information 356, quantization information 366, ms_reported information 368, ms_reported_cnt information 388, R information 378, requests 398, and received assignments 399.

User data 334 may include data/information to be processed by encoder 314 and transmitted on uplink traffic channels by transmitter 304 to BS 200, and the received data/information transmitted from BS 200 on a downlink traffic channels that has been processed through decoder 312 of receiver 302 following reception.

Requests 398 includes WT 300 uplink traffic channel requests for air link resources, e.g., bandwidth over time. Requests 398 may include encoded requests which may have been encoded in accordance with the invention, by the WT 300, prior to transmission, to include both priority and quantized requests for numbers of data units, e.g., uplink air link transmission resources. Requests 398 may also include the priority and data unit uplink traffic channel request information prior to quantization and encoding. Received assignments 399 may include uplink channel assignment messages conveying assigned uplink resources for WT 300 to use to transmit data units.

Mobile node priority queue (MPQ) stat info 346 includes n elements, one element for each of the n priorities. Each element in MPQ stat info 346, MPQ($P_1$) 348, MPQ($P_2$) 350, MPQ($P_3$) 352, MPQ($P_n$) 354 includes a number representing the number of data units that WT 300 needs at that priority level. MPQ stat info 346 represents the "true" or actual stats for WT 300. Base station priority queue (BPQ) stat. info 356 includes n elements, one element for each of the n priorities. Each element in BPQ stat info 348, BPQ($P_1$) 358, BPQ($P_2$) 360, BPQ($P_3$) 362, BPQ($P_n$) 364 includes a number representing the WT 300 understanding of the BS 200 understanding of the number of data units that WT 300 needs at that priority level.

Quantization information 366 may include formulas and/or tables known to both BS 200 and WT 300. Multiple quantization tables, e.g., a relative request quantization table 298 and an absolute request quantization table 299, may be used in some embodiments, based on, e.g., number of bits used in the encoding and/or type of request. When multiple quantization tables are used, a pre-determined understanding may exist between WT 300 and BS 200 as to correlate a request 398 to the appropriate quantization table.

Ms_reported 368 includes n elements, one element for each of the n priorities, and each element representing a flag. Each element ms_reported($P_1$) 370, ms_reported($P_2$) 372, ms_reported($P_3$) 374, ms_reported($P_n$) 376 keeps track of a priority reported by the WT 300 in an uplink traffic channel current group of requests (GOR) from the WT 300. Ms_reported_cnt 388 includes n elements, one element for each of the n priorities, and each element representing a count. Each element ms_reported_cnt($P_1$) 390, ms_reported_cnt($P_2$) 392, ms_reported_cnt($P_3$) 394, ms_reported cnt($P_n$) 396 keeps track of how many times a particular priority has been reported by the WT 300 in the uplink traffic channel current group of requests (GOR) from the WT 300.

R information 378 includes n elements, R($P_1$) 380, R($P_2$) 382, R($P_3$) 384, R($P_n$) 386, one element for each of the n priorities, and each element representing a count of a relative differences between MPQ and BPQ at each priority level, where R is clamped to 0 for negative differences. In cases, where the WT 300 may have dropped some needs for data units, e.g., a WT process, waiting to transmit data units, timed-out before a WT assignment was received, the BPQ at a priority level may have exceeded MPQ at the same priority level.

Routines 316 include communications routines 320 and wireless terminal control routines 322. Wireless terminal control routines 322 includes an uplink resource request routine 324, an uplink assignment routine 336, an uplink traffic management routine 338, a transmission routine 340, and a reception routine 342. Uplink resource request routine 324 includes a select request type subroutine 326, a generate absolute request subroutine 328, a generate replacement request subroutine 330 including a pick priority (PICK_PRI) subroutine 332, and a generate absolute request subroutine 334.

Communications routines 320 control the various communications protocols used by WT 300. Wireless terminal control routines 322 control basic wireless terminal 300 functionality including: the control of the receiver 302 and transmitter 304, power control, timing control and synchronization, control of user input/output options, control of signal reception, detection, generation, transmission, and processing including aspects related to uplink traffic channel requests by WT 300 and uplink traffic channel assignments to WT 300.

The uplink resource request routine 324 selects a type of request (absolute, replacement, or relative replacement) and generates an uplink channel request 398 for each request opportunity for which WT 300 desires to request uplink traffic channel resources. The select request type subroutine 326 may use a pre-determined method, known and agreed upon by WT 300 and BS 200, to identify the request type, e.g. absolute, relative, or replacement, and to direct flow to the corresponding subroutine 328, 330, 334. One exemplary method that may be used by the select request type subroutine 232 is to pre-define the type of requests with respect to position in a group of requests, e.g., first request in GOR is an absolute request and subsequent requests in the GOP are relative requests.

The generate absolute request subroutine, when called upon by the uplink resource request routine 324, uses the existing MPQ info to select a priority for the request, encodes the request using quantization info 366, and returns a request representation for the absolute request. In addition, the generate absolute request subroutine 328 may update the BPQ information 356, ms_reported information 368, and ms_reported_cnt information 388.

The generate relative request subroutine 334, when called upon by the uplink resource request routine 324, uses the existing MPQ info 346 and BPQ info 356 to calculate R info 378 and select a priority for the request, encodes the request using the quantization info 366, and returns a request representation for the relative request. In addition, the generate relative request subroutine 334 may update the BPQ information 356 and ms_reported information 368.

The generate replacement request subroutine 330, when called upon by the uplink resource request routine 324, uses the existing MPQ info 346 and the BPQ info 356 (if used) to select a priority for the request, encode the request using the quantization info 366, and returns a request representation for the absolute request. In addition, the generate absolute request subroutine 330 may update the BPQ information 356, ms_reported information 368, and ms_reported_cnt information 388.

Pick priority subroutine 332, when called upon by the generate replacement request subroutine 330 generates and returns a priority, e.g., using MPQ info 346, BPQ info 356, R info 378, and ms_report_count info 388.

The uplink assignment routine 336 monitors for uplink assignments 399 from BS 200 and updates the MPQ information 346 and the BPQ information 356 based on the information in the received assignments 399. The uplink traffic management routine 1432 monitors for uplink traffic arrivals and drops and updates the MPQ information 346 based upon the detected traffic changes.

Transmission routine 340 controls the transmitter 304 including the transmission of uplink traffic channel requests 398 from WT 300 to BS 200. Reception routine 342 controls the reception of signals from BS 200 including received assignments 399.

Figure 4:
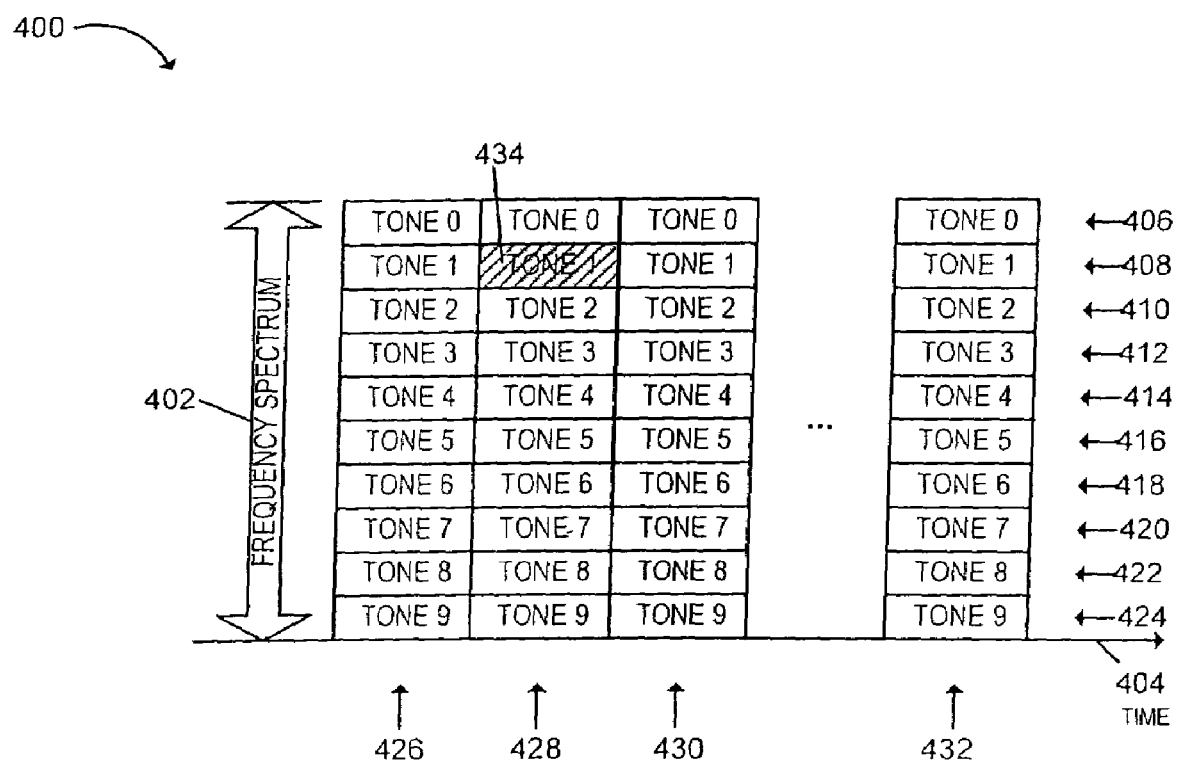
FIG. 4 illustrates exemplary air link resources, that may be used in explaining the present invention.

FIG. 4 shows a drawing 400 illustrating exemplary air link resources. The air link resource available for uplink traffic communications from the wireless terminal 300 to BS 200 may be represented by frequency spectrum 402 over time. Frequency spectrum 400 corresponds to a tone set which includes tones 0 through 9. First through tenth rows 406, 408, 410, 412, 414, 416, 418, 420, 422, 422 correspond to tones 0, 1, 2, 3, 4, 5, 6, 7, 8, and 9, respectively. The time domain represented by horizontal line 404 may be subdivided into basic units of time, e.g., an OFDM symbol time or a dwell time. FIG. 400 shows four columns 426, 428, 430, 432, each column representing one basic unit of time. Each tone over one basic unit of time may represent a basic air link resource unit, e.g. tone 1 408 during time interval 428 as represented by shaded box 434. Each basic air link resource unit may correspond to the air link resource needed for WT 300 to transmit one uplink data unit represented as a count of one in one of the MPQ stat info entries 348, 350, 352, 354. Requests 398 may include multiples of basic units, representing requested multiples of basic air link resource units. Uplink traffic assignments by BS 200 to WT 300 may assign the basic air link resources to WT 300.

Figure 5:
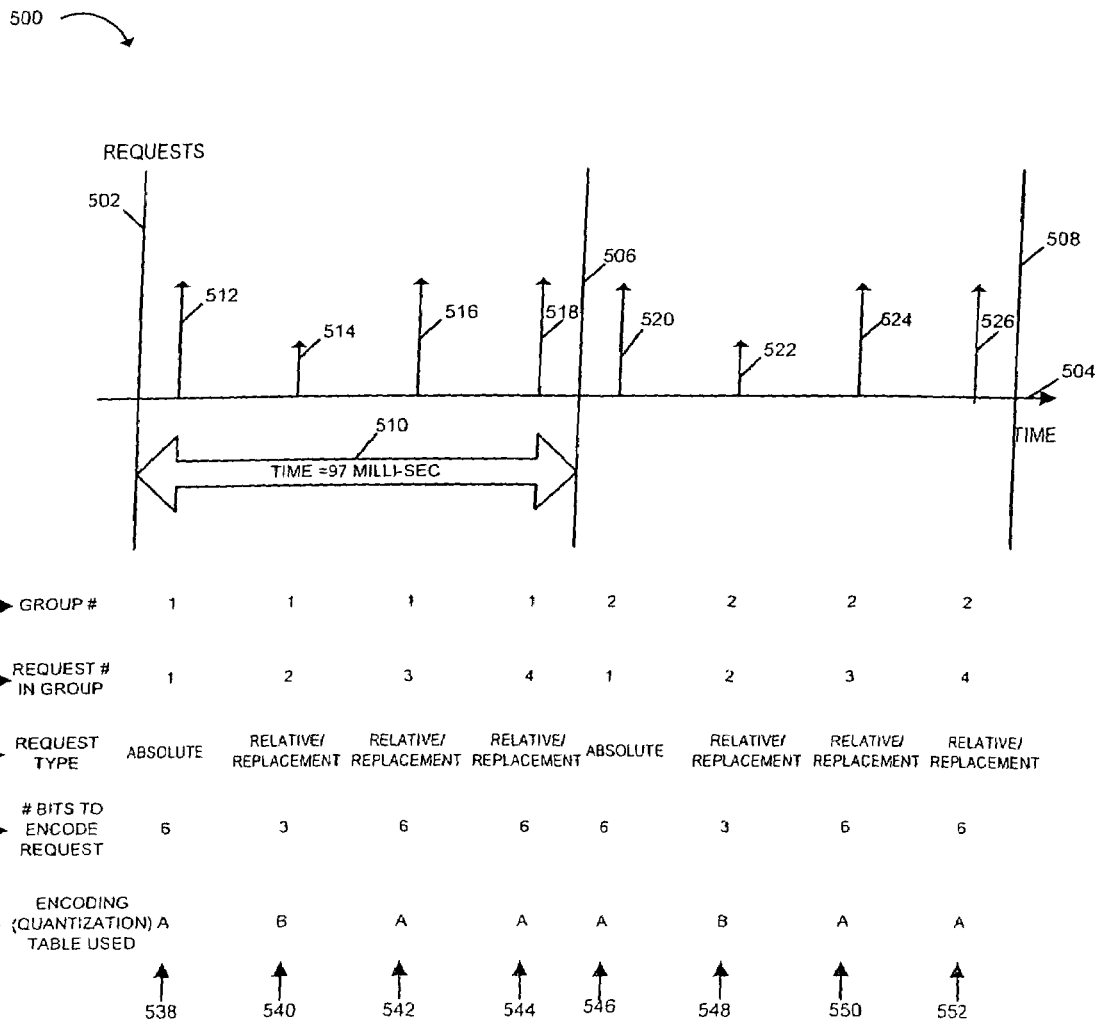
FIG. 5 illustrates exemplary uplink traffic requests, in accordance with the present invention.

FIG. 5 shows a drawing/table 500 illustrating exemplary uplink traffic requests and exemplary uplink traffic groups of requests, in accordance with the present invention.

Horizontal axis 504 represents time. Vertical lines 502 and 506 represent time boundaries for a first group of uplink traffic request from WT 300 to BS 200 defining a time interval 510 of 97 milli-sec. The first group of requests includes 4 requests, a first request 512, a second request 514, a third request 516, and a fourth request 518. Vertical lines 506 and 508 represent time boundaries for a second group of uplink traffic request from WT 300 to BS 200. The second group of requests includes 4 requests, a first request 520, a second request 522, a third request 524, and a fourth request 526. First row identifies the group number to which each request belongs. Second row 530 identifies the position of each request within each group. Third row 532 identifies the request type. Fourth row 534 identifies the number of bits used to encode a request. Fifth row 536 identifies a quantization (encoding) table used to encode the request.

First through eighth columns 538, 540, 542, 544, 546, 548, 550, 552 correspond to requests 512, 514, 516, 518, 520, 522, 524, and 526, respectively.

Figure 6:
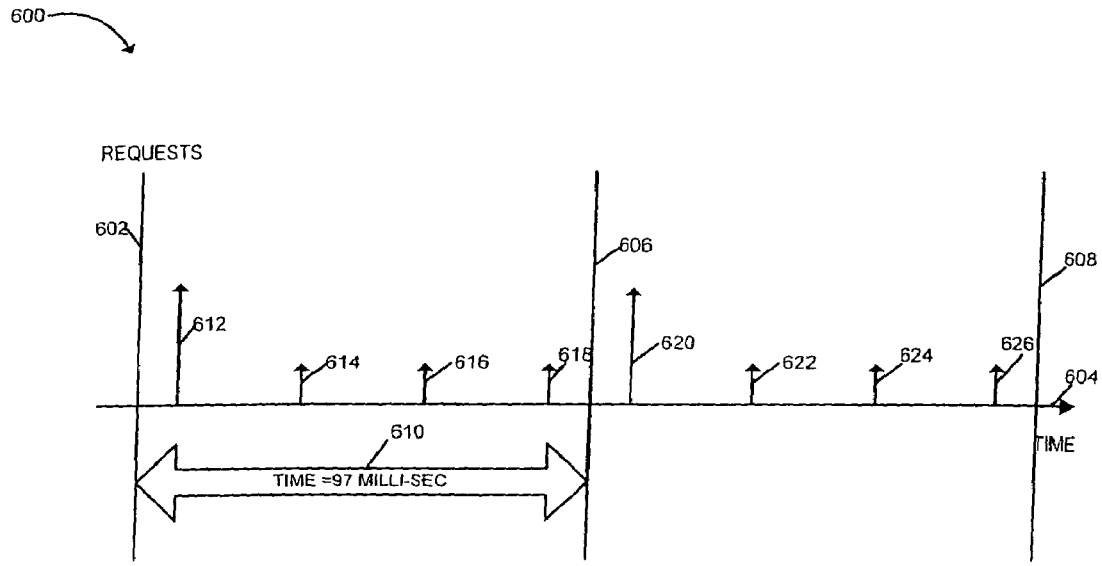
FIG. 6 illustrates addition exemplary uplink traffic requests, in accordance with the present invention.

FIG. 6 shows a drawing/table 600 illustrating exemplary uplink traffic requests and exemplary uplink traffic groups of requests, in accordance with the present invention. Horizontal axis 604 represents time. Vertical lines 602 and 606 represent time boundaries for a first group of uplink traffic request from WT 300 to BS 200 defining a time interval 610 of 97 milli-sec. The first group of requests includes 4 requests, a first request 612, a second request 614, a third request 616, and a fourth request 618. Vertical lines 606 and 608 represent time boundaries for a second group of uplink traffic request from WT 300 to BS 200. The second group of requests includes 4 requests, a first request 620, a second request 622, a third request 624, and a fourth request 626. First row 628 identifies the group number to which each request belongs. Second row 630 identifies the position of each request within each group. Third row 632 identifies the request type. Fourth row 634 identifies the number of bits used to encode a request. Fifth row 636 identifies a quantization (encoding) table used to encode the request. First through eighth columns 638, 640, 642, 644, 646, 648, 650, 652 correspond to requests 612, 614, 616, 618, 620, 622, 624, and 626, respectively.

Figure 7:
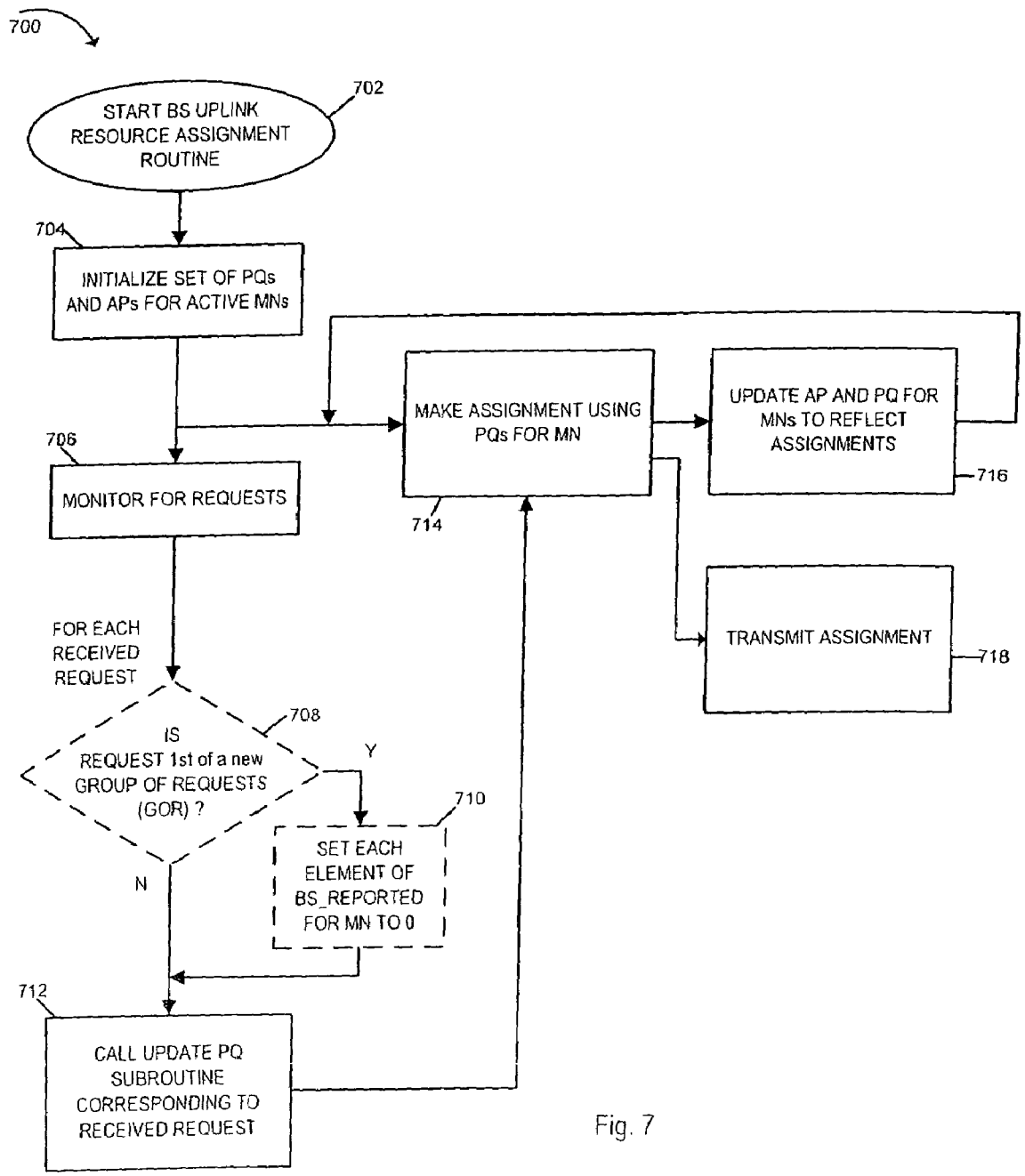
FIG. 7 shows a flowchart illustrating a method of uplink resource assignment, of the present invention, that may be performed by a base station.

FIG. 7 shows a flowchart 700 illustrating the method of the base station's uplink resource assignment routine 226. Processing starts in step 702 when CPU 206 starts execution of the uplink resource assignment routine 226. Next, in step 704, the sets of PQ stat info 278 for each MN and the assignment pipeline 252 is initialized, e.g. numbers of requested data units at each priority level 280, 282, 284, 286, assigned data 260, 262, 264, 266, 268, 270 and WT ID 258 is set to 0. Each wireless terminal 300 operating in base station 200's cell has a dedicated uplink traffic channel request channel on which the wireless terminal 300 at specific times and at a specific frequency, said specific times and specific frequency known by both BS 200 and WT 300, may transmit uplink channel traffic requests to BS 200. The timing of request may indicate the type of request with different requests in a GOR being transmitted at pre-selected known times in some embodiments. From initialization step 704 operation proceeds to steps 706 and 714. Step 706 represents the start of a PQ update processing path while step 714 represents the start of an assignment loop. In step 706, the BS 200 monitors for uplink traffic channel requests from wireless terminals. The monitoring is performed on an on-going basis.

For each received uplink traffic channel request received from a WT 300 in step 706, operation proceeds to step 708 or directly to step 712 depending on whether or not relative requests are supported. If the implementation uses relative requests, then flow proceeds to step 708, otherwise flow proceeds directly to step 712. Assuming relative requests are used in step 708, a check is made to see if this request is the first of a new group of requests (GOR). A number of uplink traffic channel requests over an interval of time, agreed upon by BS 200 and WT 300, may be viewed as a group of requests (GOR). If the received request is the first of a new GOR, then step 710 is performed in which each element of bs_reported 290, 292, 294, 296 is set to 0 for the MN corresponding to the request, e.g., the flag buffer is reset, with processing then proceeding to step 712 from step 708. If the received request is not the $1^{st}$ in a new group of requests, operation, then step 710 is bypassed and operation proceeds directly to step 712 from step 708. In step 712, a call is made to the PQ update subroutine 228. PQ update subroutine updates the PQ stat info 278 and the assignment pipeline info 252 for MN 300, in some embodiments, the bs_reported flags 288 for MN 300 are also updated based on information included in the request.

Updated PQ information is supplied for use to step 714, where BS 200 makes assignments for the MN based upon the updated PQ 278. BS 200 may use the updated PQs 278 for each of the MNs in making decisions regarding the allocation of the uplink air link resources between the competing MNs. BS 200 may generate an assignment for the MN 300 and the scheduler module 224 may schedule the assignment. After the assignment is made in step 714, the assignment is used to update the AP 252 and the PQ 278 to reflect the assignment in step 716, and the assignment is transmitted in step 718. In step 716, the assignments made in step 714 are recorded by the BS in a circular array called assignment pipeline (AP)252. The assignment information including the mobile node's id, total number of data units assigned (which is sent conveyed to MN), and how these data units would get allocated to priorities (BS's understanding of this allocation) is recorded as the most recent entry in the assignment pipeline. Also, PQ is updated for this assignment to reflect the count of data units of each priority that are still unserviced by the BS. Transmission of the assignment in step 718 is performed by transmitter 204 under the direction of the transmission routine 242. Flow proceeds back to step 706 to step 714 where the generation of uplink traffic channel assignments also continues on an ongoing basis, e.g., using updated PQ information generated in step 712 in response to received requests.

Figure 8:
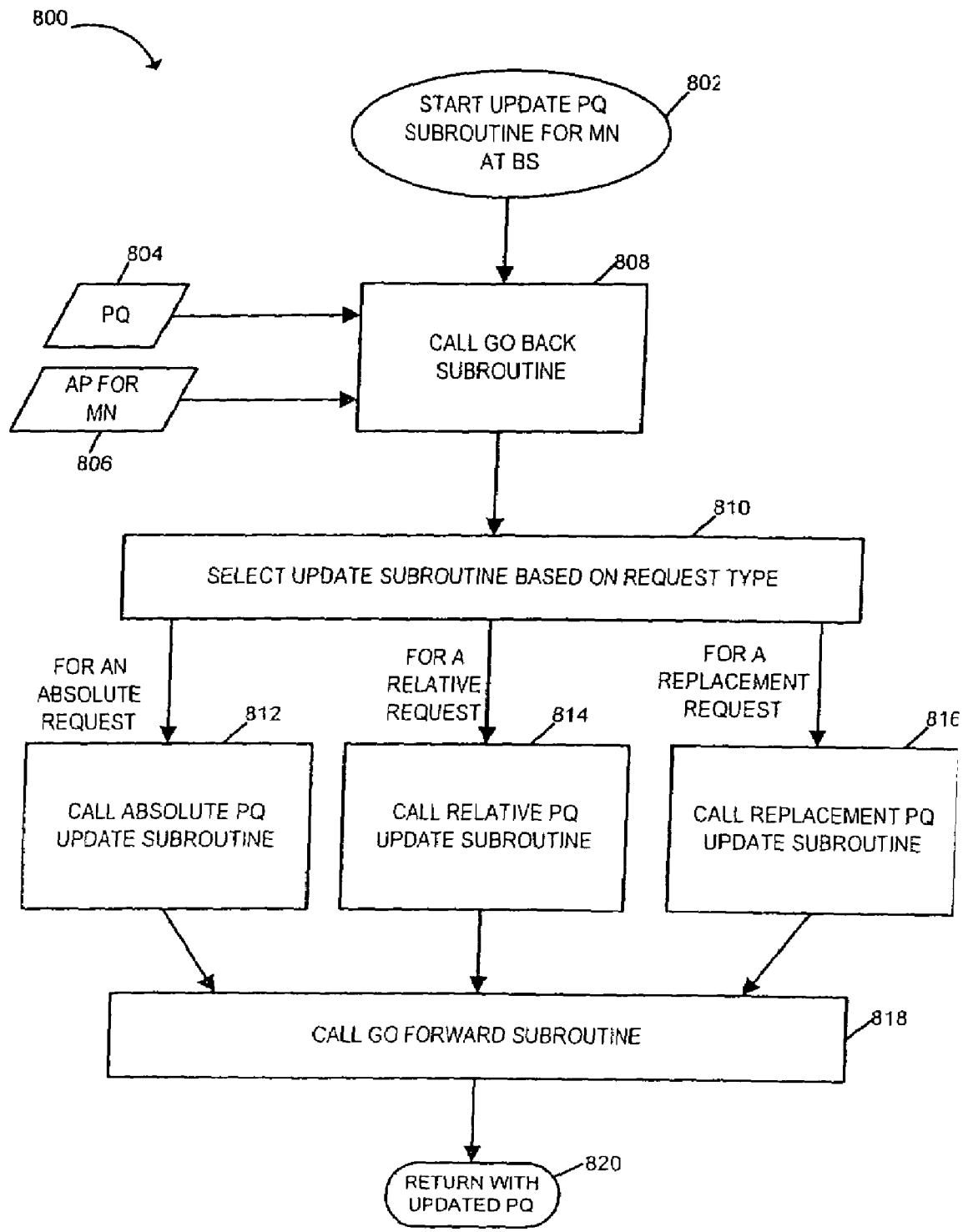
FIG. 8 shows a flowchart illustrating a method of a go back subroutine, of the present invention, that may be performed by a base station as part of the uplink resource assignment method.

FIG. 8 shows a flowchart 800 illustrating the method of the base station's update PQ subroutine 228. Operation starts in step 802, when the update PQ subroutine 228 is called by the uplink resource assignment routine 226. Flow proceeds to step 802, where go back subroutine 230 is called and PQ info 804 and AP info 806 is input. Step 808 updates PQ using input 804 nd past assignments from AP info 806 and returns an updated PQ for the MN. The returned PQ indicates the status of the PQ at the time the MN made the request. Next, flow proceeds to step 810, where select update step 232 selects either absolute PQ update subroutine 234 for an absolute request, relative PQ update subroutine 236 for a relative request, or replacement PQ update subroutine 816 for a replacement request. In one embodiment, the selection made in step 810 may be based upon a pre-determined understanding between BS 200 and MN 300, e.g., the implementation may use specific types of requests at specific locations within a group of requests. For the absolute request, flow is directed to step 812, where a call is made to absolute PQ update subroutine 234, and an updated PQ for the MN, and in some embodiments an updated bs_reported for the MN is returned, in accordance with the invention. For the relative request, flow is directed to step 814, where a call is made to relative PQ update subroutine 236, and an updated PQ for the MN, and an updated bs_reported for the MN is returned, in accordance with the invention. For the replacement request, flow is directed to step 816, where a call is made to replacement PQ update subroutine 238, and an updated PQ for the MN is returned, in accordance with the invention. The updating in steps 812, 814, or 816 involves the decoding and incorporation of information included in the request. Flow proceeds from step 812, 814, or 816, to step 818 where the go forward subroutine 240 moves the PQ forward in time, e.g., updates the PQ information to reflect status at a more recent time, by using the recent pipeline assignments and returns an updated current PQ. Then in step 820 operation returns to the point from which the PQ subroutine was called by another routine.

In addition to absolute, relative, and replacement request types, minimum replacement (MR) requests are also possible in some embodiments in accordance with the invention. These MR requests work similar to replacement requests except that the count mentioned in an MR request specifies that the MN has at least that many data units of a given priority. In this case of an MR request, the BS replaces the count in PQ with that given in the request if the count in PQ is less than that given in the request.

Figure 9:
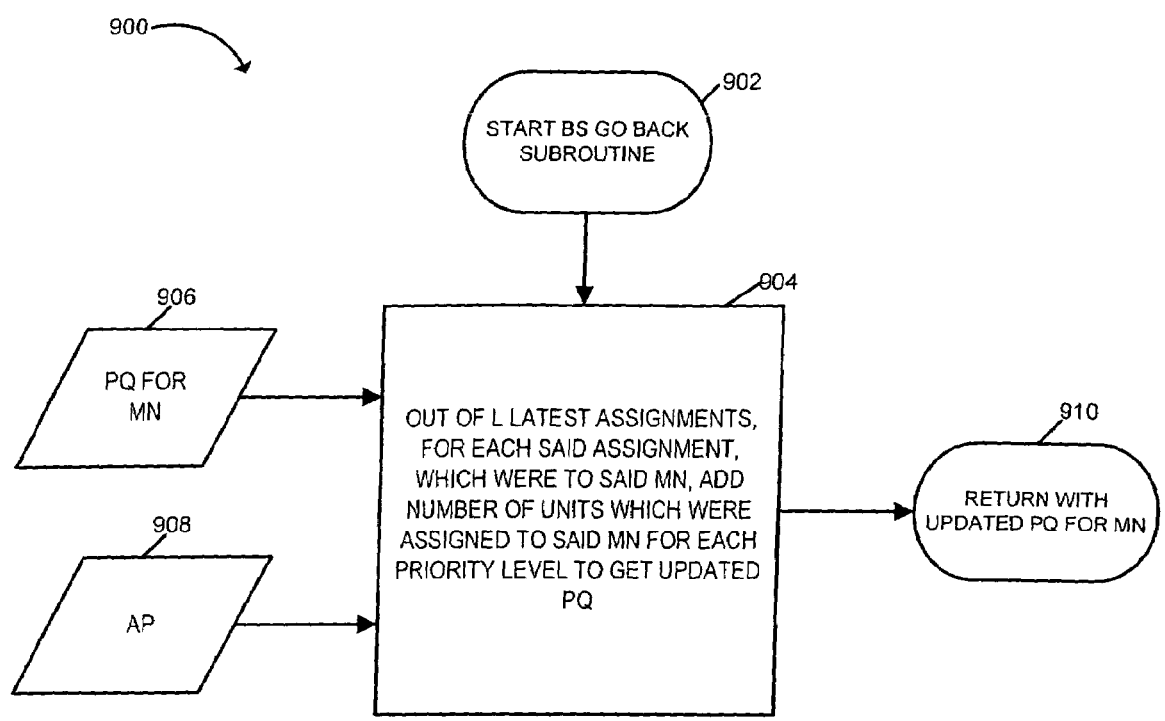
FIG. 9 shows a flowchart illustrating a method of a PQ update subroutine, of the present invention, that may be performed by a base station as part of the uplink resource assignment method.

FIG. 9 shows a flowchart 900 illustrating steps of the method of the base station's go back subroutine 230. Operation starts in step 902, when the go back subroutine 230 is called by the update PQ subroutine 228. Operation proceeds to step 904, where the PQ is updated, e.g., the PQ for the MN is processed to appear as it should have been back at the time that the MN made the request. PQ for MN information 906 and the AP 908 are inputs to step 904. In step 904, information is extracted out of the last L assignments in the pipeline. From the set of last L assignments, out of those assignment corresponding to said MN, the number of data units which were assigned to said MN for each priority level are added to the PQ for the MN at the same priority level, e.g., the count at each priority level for which assignments were made to the MN is updated based on the corresponding number of assigned data units. Flow proceeds from step 904 to step 910 where the subroutine terminates and returns the updated PQ for the MN.

In some implementations it is possible for go back routine 230 to update PQ for each of the mobiles in the go back routine 230, e.g., by applying the information in the L latest assignments to the PQs corresponding to the MNs to which the assignments were made.

Alternative structures of the assignment pipeline are possible as previously described. In some embodiments, the go back subroutine 230 can be eliminated. In such embodiments the BS 200 stores a time delayed copy of the PQ for each MN. For implementations using go back subroutine 230, actual numbers of assignments, the priority levels to which the assignments are made and an identifier identifying the MN to which the assignments were made are stored as a vector for use in updated the PQ information as needed.

Figure 10:
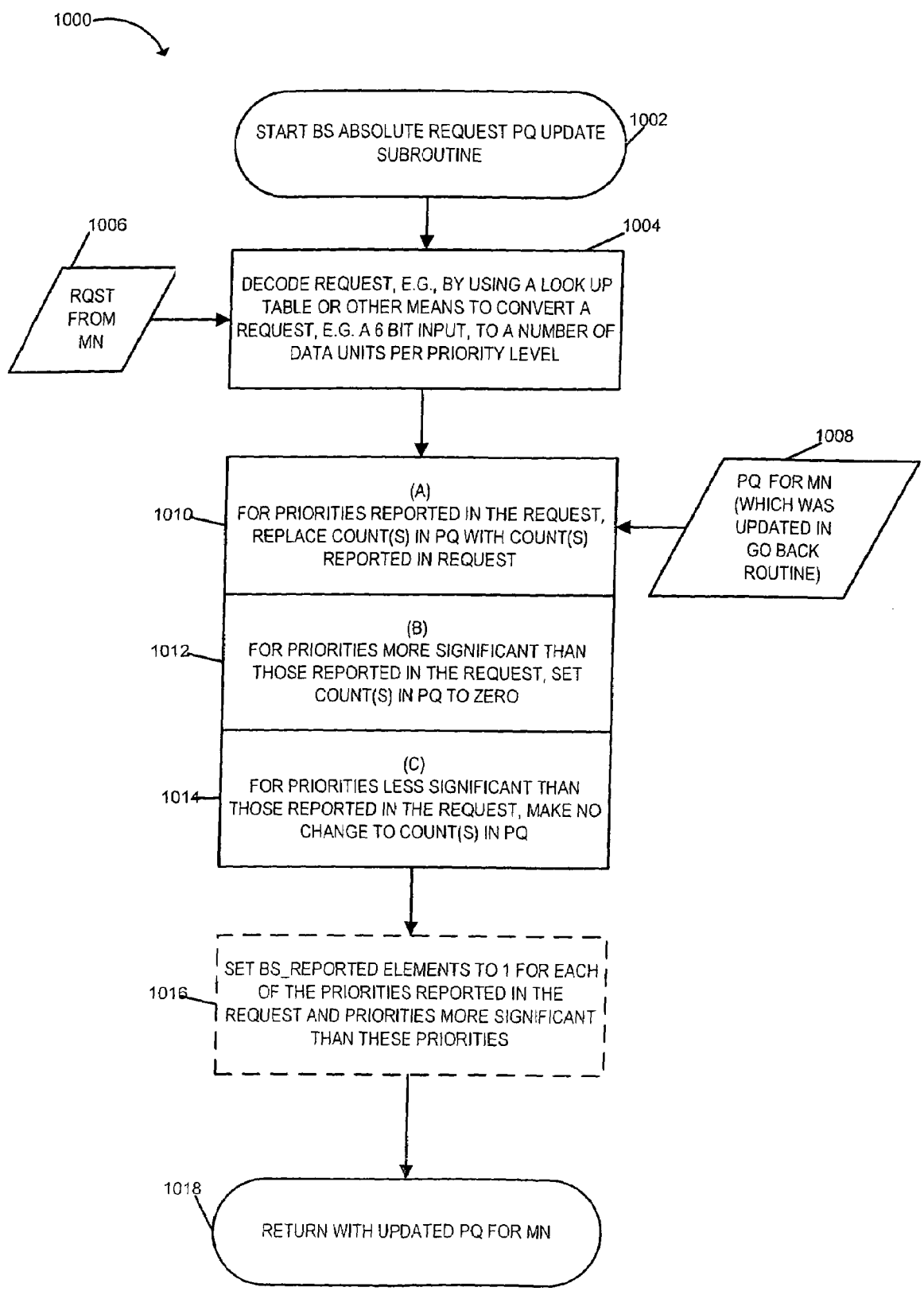
FIG. 10 shows a flowchart illustrating a method of an absolute request PQ update subroutine, of the present invention, that may be performed by a base station as part of the PQ update method.

FIG. 10 shows a flowchart 1000 illustrating the method of the base station's absolute request PQ update subroutine 234. Operation starts in step 1002 when the PQ update subroutine 228 calls the absolute request PQ update subroutine 234. Operation proceeds to step 1004, where subroutine 234 receives input in the form of a request from an MN 1006, e.g. a 6 bit encoded request. In step 1004, the request 1006 is decoded, e.g., by using a look up table 299 or other means to convert the request into a number of data units per priority level. Flow proceeds from step 1004 to step 1010, where the PQ for MN (which was updated in the go back routine 230) 1008 is input. In step 1010, part A of the PQ update, for priorities reported in the request, the count(s) in the PQ are replaced with those count(s) reported in the request. Proceeding to step 1012, part B of the PQ update, for priorities more significant than those reported in the request, the count(s) in PQ are set to zero. Proceeding to step 1014, part C of the PQ update, for priorities less significant than those reported in the request, no change is made to count(s) in the PQ. Next, step 1016, is performed in embodiments using bs_reported, e.g., implementations using absolute and relative requests at different times. In step 1016, bs_reported elements are set to 1 for each of the priorities reported in the request and priorities more significant than these priorities. Next, in step 1018, absolute request PQ update subroutine returns the updated PQ for the MN and, in some embodiments, the updated bs_reported.

Figure 11:
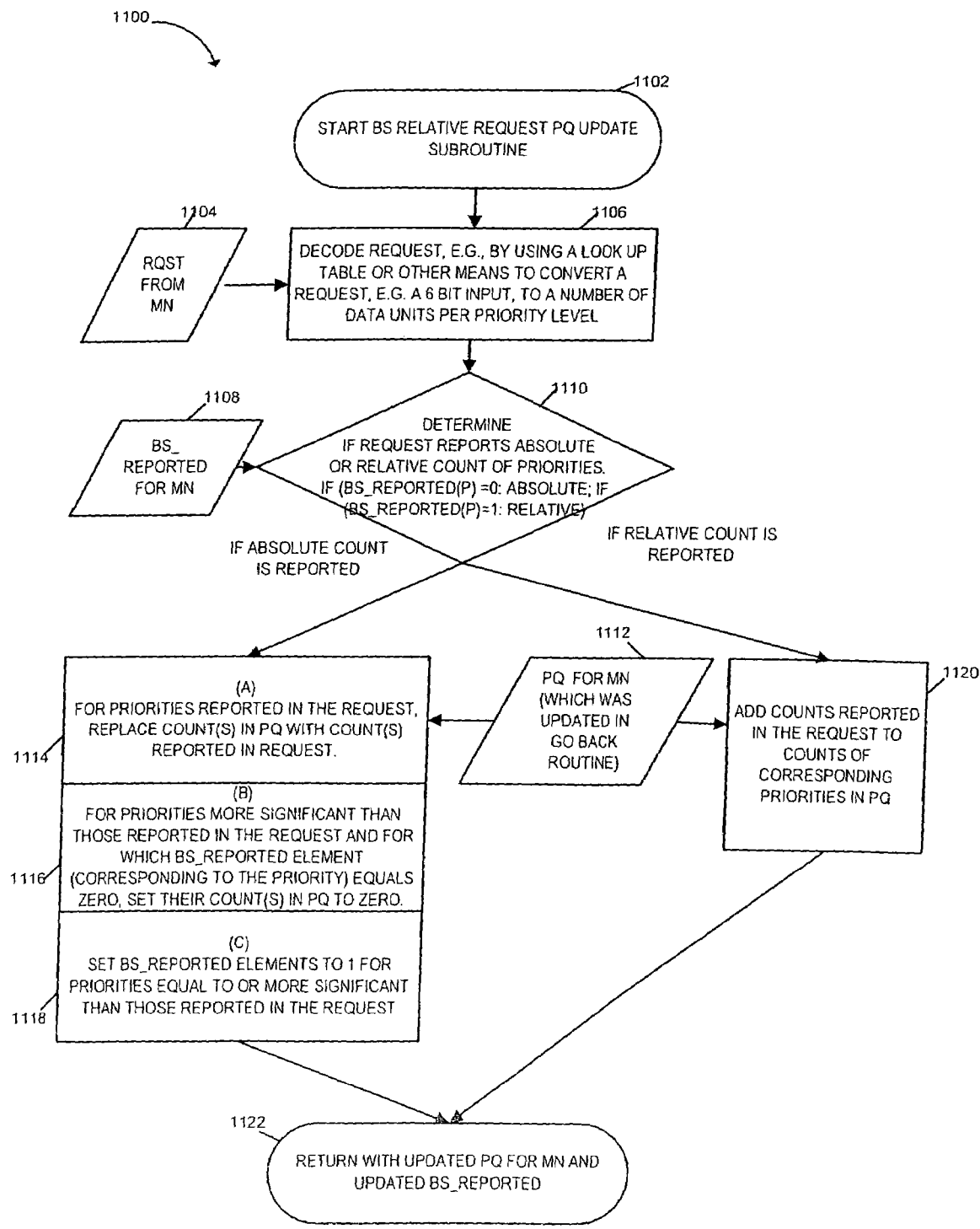
FIG. 11 shows a flowchart illustrating a method a relative request PQ update subroutine, of the present invention, that may be performed by a base station as part of the PQ update method.

FIG. 11 shows a flowchart 1100 illustrating the method of the base station's relative request PQ update subroutine 236. Operation starts in step 1102 when the PQ update subroutine 228 calls the relative request PQ update subroutine 236. Operation proceeds to step 1106, where subroutine 236 receives input in the form of a request from an MN 1104, e.g. a 6 bit encoded request. In step 1106, the request 1004 is decoded, e.g., by using a look up table 298 or other methods to convert the request into a number of data units per priority level. Flow proceeds from step 1106 to step 1110, where the bs_reported for MN 1108 is input. In step 1110 it is determined whether the request reports absolute or relative counts of priorities. If bs_reported(p)=0, then the request reports an absolute count for priority p, and flow proceeds to step 1114; however, if bs_reported(p)=1, then the request reports a relative count for priority p and flow proceeds to step 1120. The PQ 1112 for MN (which was updated in go back subroutine 230 is input to step 1114 and step 1120.

Assuming an absolute count was reported, operation proceeded to step 1114, part A of the PQ update. In step 1114, for priorities reported in the request, the corresponding data unit count(s) in the PQ are replaced with those count(s) reported in the request. Proceeding to step 1116, part B of the PQ update, for priorities more significant than those reported in the request and for which the element of bs_reported=0, the count(s) in PQ are set to zero. Proceeding to step 1118, part C of the PQ update, for priorities equal to or more significant than those reported in the request, set the element of bs_reported to 1. Operation proceeds from step 1118 to step 1122.

If however, a relative count was reported, operation proceeded to step 1120, where the counts reported in the request are added to the counts of corresponding priorities in the PQ for the MN. Next, flow proceeds to step 1122. In step 1122, relative request PQ update subroutine 236 returns with updated PQ for MN and an update bs_reported for the MN, and terminates operation of the subroutine 236.

Figure 12:
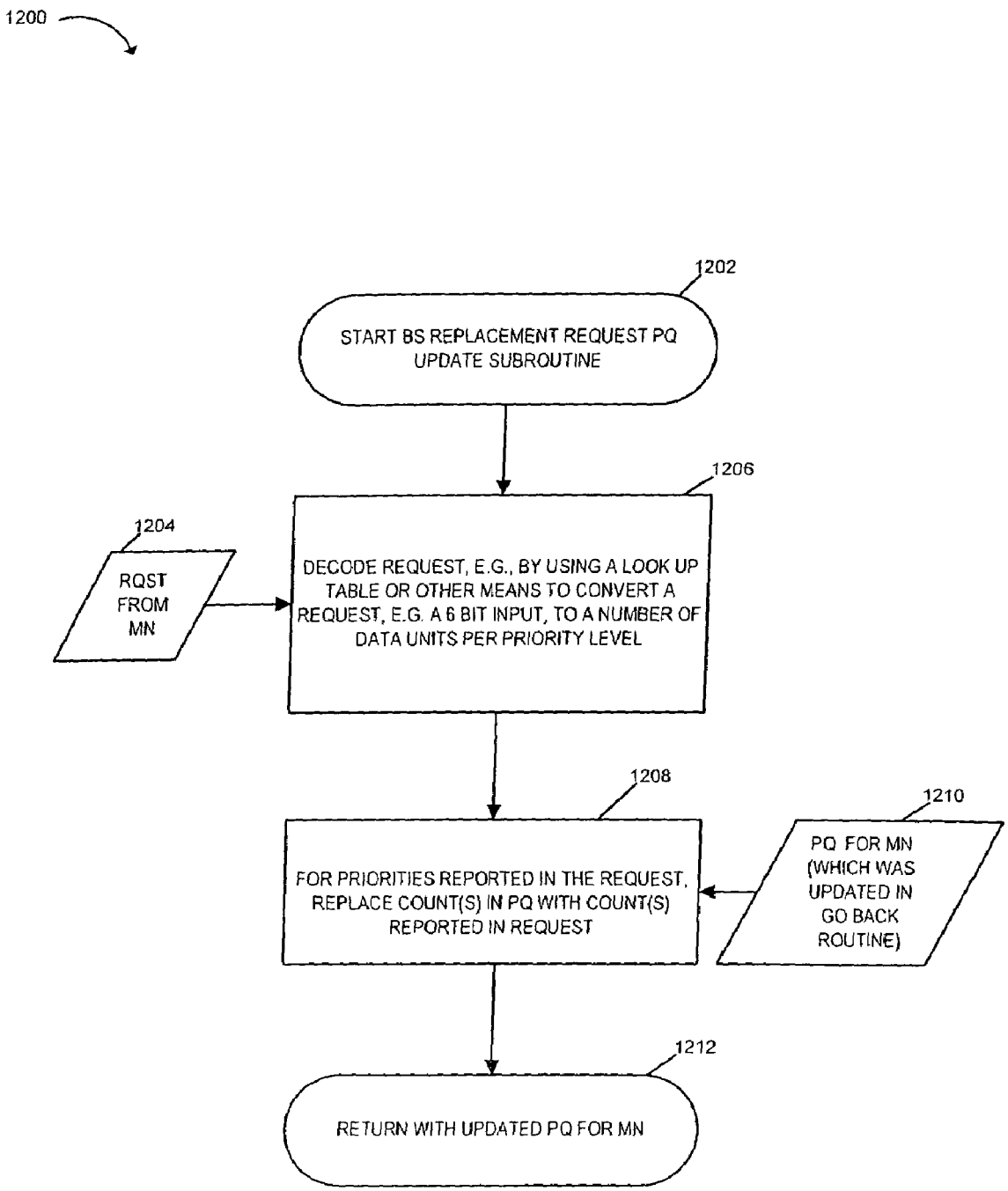
FIG. 12 shows a flowchart illustrating a method of a replacement request PQ update subroutine, of the present invention, that may be performed by a base station as part of the PQ update method.

FIG. 12 shows a flowchart 1200 illustrating the method of the base station's replacement request PQ update subroutine 238. Operation starts in step 1202 when the PQ update subroutine 228 calls the replacement request PQ update subroutine 238. Operation proceeds to step 1204, where subroutine 238 receives input in the form of a request from an MN 1204, e.g. a 6 bit encoded request. In step 1206, the request 1204 is decoded, e.g., by using a look up table or other means to convert the request into a number of data units per priority level. Flow proceeds from step 1206 to step 1208, where the PQ for MN (which was updated in the go back routine 230) 1210 is input. In step 1210 for priorities reported in the request, the count(s) in the PQ are replaced with those count(s) reported in the request. Next, in step 1212, replacement request PQ update subroutine 238 returns the updated PQ for the MN and terminates.

Figure 13:
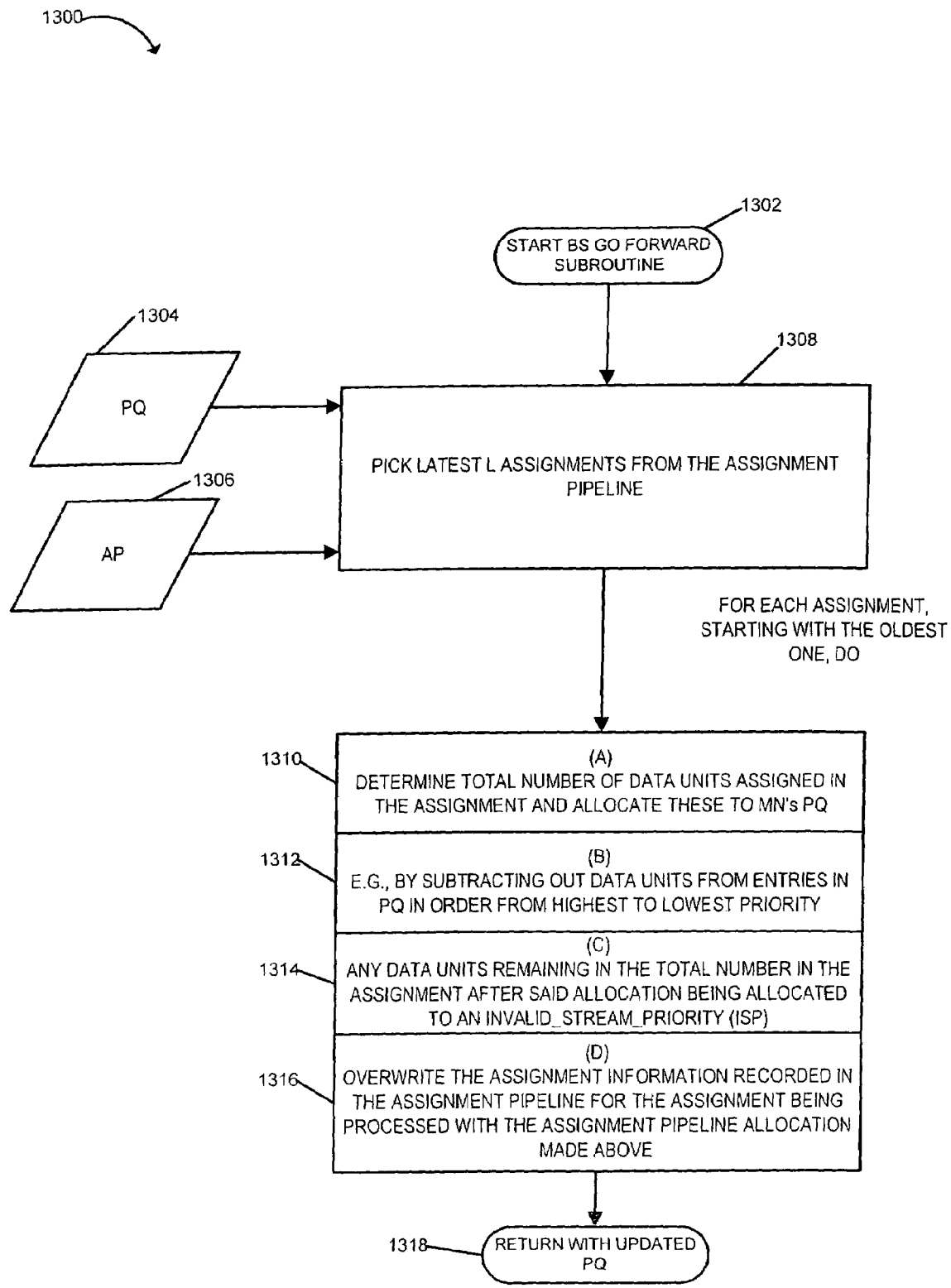
FIG. 13 shows a flowchart illustrating a method of a go forward subroutine, of the present invention, that may be performed by a base station as part of the uplink resource assignment method.

FIG. 13 shows a flowchart 1300 illustrating the method of the base station's go forward subroutine 240. Operation starts in step 1302 when the PQ update subroutine 228 calls the go forward subroutine 240. Operation proceeds to step 1204, where subroutine 240 receives input PQ information 1304 (which was output from absolute, relative or replacement update subroutines 234,236,238) and assignment pipeline information 1306. In step 1308, pick the latest L assignments from the assignment pipeline. For each of the assignments, which pertain to the MN of the corresponding request being processed, starting with the oldest one, perform steps 1310, 1312, 1314, and 1316. Determine the total number of data units assigned in the assignment and allocate these to MN's PQ (A step 1310), by, e.g., subtracting out data units from entries in the PQ in order form highest to lowest priority (B step 1312). Then, any data units remaining in the total number in the assignment after said allocation are allocated to an invalid_stream_priority (step 1313). Next, in step 1316, the assignment information recorded in the assignment pipeline for the assignment being processed is overwritten by the assignment pipeline allocation made above (steps 1310, 1312, 1314). Next, in step 1318, go forward subroutine 240 returns with the updated PQ and routine 240 terminates.

Figure 14:
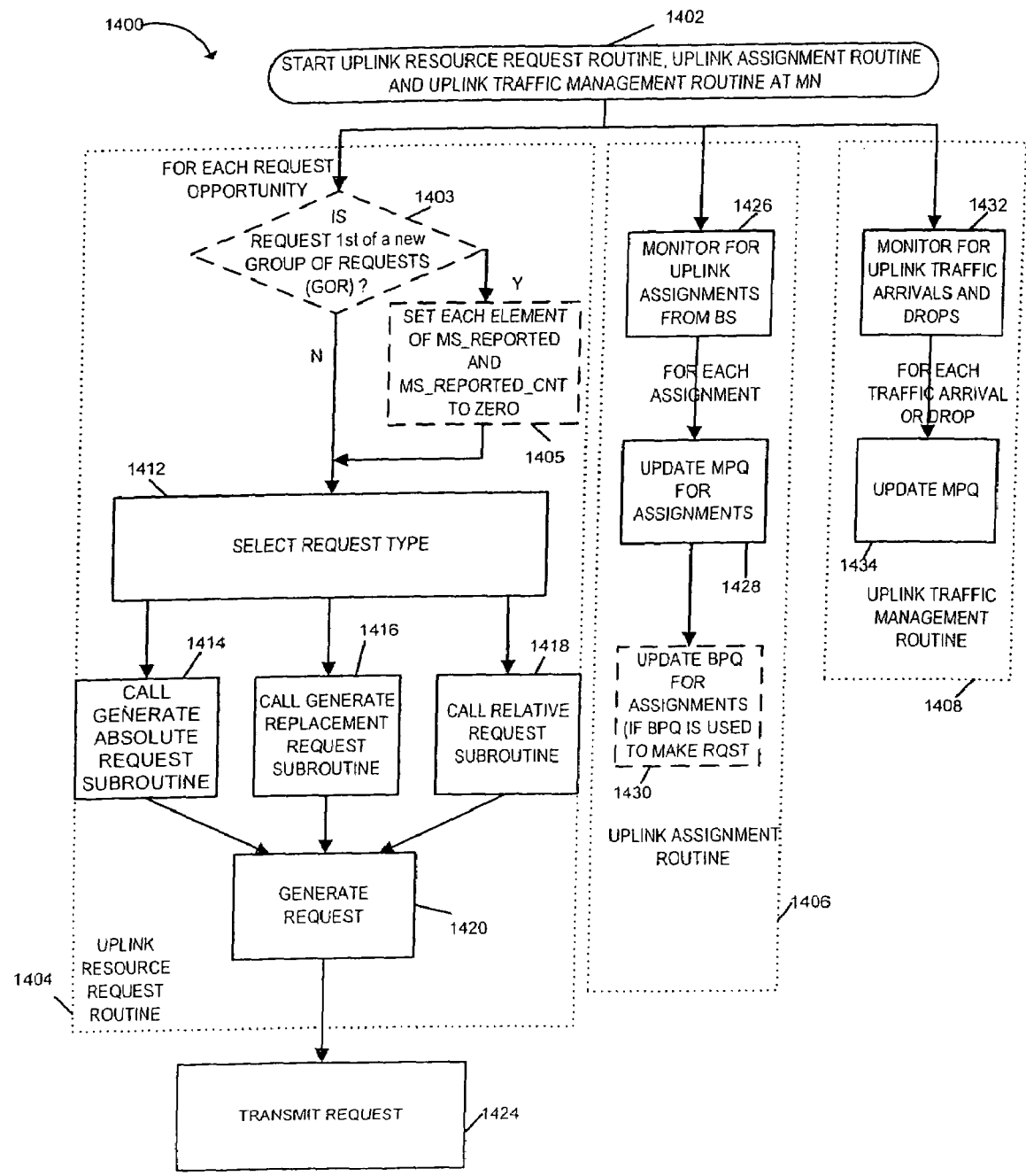
FIG. 14 shows a flowchart illustrating methods of an uplink resource request routine, and uplink resource assignment routine, and an uplink resource traffic management routine, of the present invention that may be performed by a wireless terminal.

FIG. 14 shows a flowchart 1400 illustrating methods used by the mobile node (MN) 300 relating to uplink resource requests, in accordance with the present invention. Processing starts in step 1402 when CPU 306 starts execution of the uplink resource request routine 324, uplink assignment routine 336, and uplink traffic management routine 1408. In step 1402, the mobile node priority queue stat. info (MPQ) 346, base station priority queue stat info (BPQ) 356, ms_reported info 238, R info 378, and ms_reported count info 388 are initialized, e.g., elements are set to zero.

Flow chart 1400 can be subdivided into 3 section: an uplink resource request routine section 1404, and uplink assignment routine section 1406, and an uplink traffic management routine section 1408.

Proceeding along the path of the uplink resource request routine 1404, operation proceeds to step 1403, for each request opportunity. In some embodiments, request opportunities can be at predetermined times and frequencies, known and agreed upon both the BS 200 and MN 300, for each MN. In some embodiments steps, 1403 and 1405 are performed, while in other embodiments operation may proceed directly to step 1412. In some embodiments, step 1405 involves setting at least one of ms_reported and ms_reported_cnt to zero.

In embodiments where steps 1403 and 1405 performed, in step 1403 a check is made to determine whether this request opportunity is the $1^{st}$ request of a new group of requests (GOR).

If this is the first request in a group, then each element of ms_reported and/or each element of ms_reported_cnt is set to zero in step 1415, and then operation proceeds to step 1412. Otherwise, operation proceeds to step 1412.

In step 1412, the request type of the uplink traffic channel resource request message is selected under the control of select request type subroutine. In some embodiments, the type of request is predetermined by position with the group of requests and known to both the base station 200 and the MN 300. In step 1412, if a absolute request is selected to be generation operation is directed to step 1414; if a replacement request is selected to be generated operation is directed to step 1416; if a relative request is selected to be generated, operation is directed to step 1418.

In step 1414, a call is made to generate absolute request subroutine 328 and an absolute request is generated as output to step 1420. In step 1416, a call is made to generate replacement request subroutine 330 and a replacement request is generated as output to step 1420. In step 1418, a call is made to generate relative request subroutine 334 and a relative request is generated as output to step 1420. In step 1420, the final request to be transmitted is generated. Step 1420 may involve the transfer of the output from step 1414, 1416, or 1418 to a designated location in memory reserved for uplink traffic channel request messages 398 or may involve additional processing, e.g. additional formatting. Operation proceeds to step 1424, in which the transmitter 304, under control of the transmission routine 340, transmits the uplink traffic resource request to BS 200.

In addition to absolute, relative, and replacement request types, minimum replacement (MR) request types are also possible in some embodiments of the invention. The MR requests are similar to replacement requests except that the count mentioned in an MR request specifies that the MN has at least that many data units in a given priority.

The uplink assignment routine 336 is operating in parallel to the uplink resource request routine 324. Section 1406 of flowchart 1400 describes the method of the uplink assignment routine 336. Operation proceeds from step 1402 (initialization) to step 1426 where MN 300 monitors for uplink assignments from the BS 200. For each received assignment 339, operation proceeds to step 1428 where the MPQ 346, is updated based on the assignment received. Next, in step 1430, the MPQ is updated based on the received assignments, in implementations where the BPQ is used to generate requests, e.g., systems generating relative requests. The updated MPQ and optionally BPQ, are used by subroutines 328, 332, 334 in the uplink resource request routine 324 when generating requests.

Here is an example where MPQ and optionally BPQ are updated in step 1428 and 1430 respectively. Suppose MPQ=[3 2 7] before the assignment where first element (3) represents data unit counts for highest priority, second (2) for next highest, and so on. Last element (7) represents count for least significant priority. Suppose an assignment of 4 data units was made.

This will be used to service data units from highest to lowest priority in that order. Thus after the assignment, the 3 data units of highest priority get served, and 1 data unit of next highest priority gets served. Thus MPQ becomes [0 1 7] after the assignment. BPQ is updated in a similar manner.

The uplink traffic management routine 338 is operating in parallel to the uplink resource request routine 324 and the uplink assignment routine 336. Section 1408 of flowchart 1400 describes the method of the uplink traffic management routine 338. Operation proceeds from step 1402 (initialization) to step 1432 where MN 300 monitors for uplink traffic arrivals and drop outs. For example if an additional application comes on-line, more uplink traffic resources may be needed or if an application times-out waiting for uplink traffic air link resources that are not allocated in time to be useful, the application may drop its request. For each traffic arrival or drop, operation proceeds to step 1434 where the MPQ 346, is updated based on the changing level of needs. The updated MPQ, is used by subroutines 328, 332, 334 in the uplink resource request routine 324 when generating requests.

Figure 15:
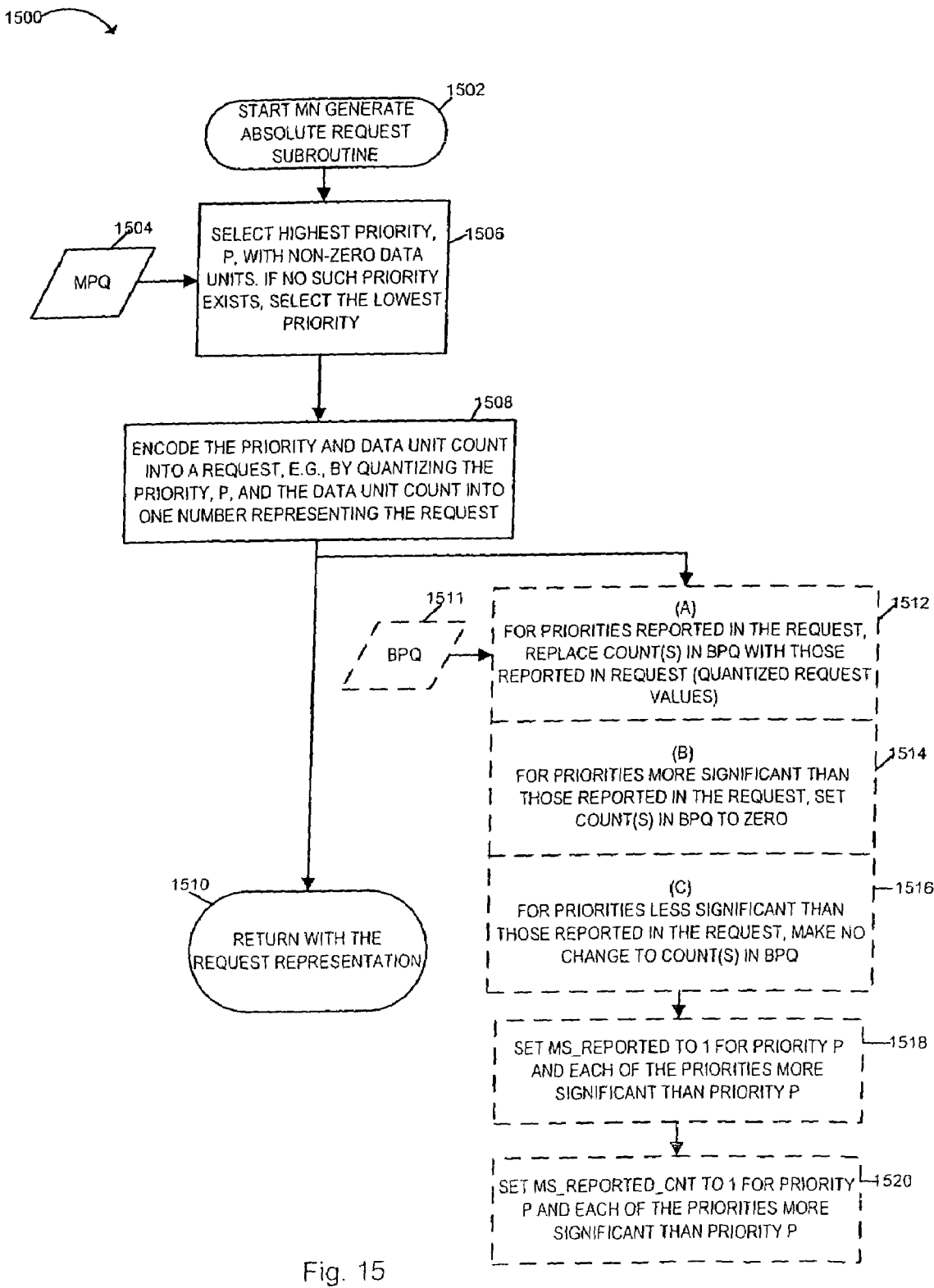
FIG. 15 shows a flowchart illustrating a method of a generate absolute request subroutine, of the present invention, that may be performed by a wireless terminal as part of the uplink resource request method.

FIG. 15 shows a flowchart 1500 illustrating the method of the mobile node's generate absolute request subroutine 328. Operation starts in step 1502 when the uplink resource request routine 324 calls the generate absolute request subroutine 328. Operation proceeds to step 1506, where subroutine 328 receives input, MPQ 1504.

In step 1506, the highest priority, P, in MPQ with non-zero data units is selected; if no such priority exists, the lowest priority is selected. In some embodiments, it is possible to generate and send a request for 0 units. Next, in step 1508, the selected priority with its corresponding data unit count is encoded into a request, e.g., by quantizing the priority P and the data unit count into one number, e.g. a 6 bit representation, representing the request.

Quantization information 366, including look-up tables, formulas, or other methods known to both the BS 200 and the MN 300 may be used. In some embodiments, a quantization scheme in which some bits tell about the priority reported in the request and others give an index into a table, whose corresponding entry gives the data unit count, is used. For example, with a 6 bit encoded request, the first 2 bits can specify priority, and the remaining four bits specify the table entry that gives the data count. In still other embodiments, some bits may identify the priority in the request and other bits may give the data unit count directly.

In embodiments using BPQ in the request generation, operation proceeds to step 1512. In step 1512, part A of the BPQ update, the BPQ 1511 is input and for priorities reported in the request, the count(s) in BPQ are replaced with those counts reported in the request, using quantized request values. Next in step 1514, part B of the BPQ update, for priorities more significant than those reported in the request, the count(s) in BPQ are set to zero. Then, in step 1516, part C of the BPQ update, for priorities less significant than those reported in the request, no change is made to the count(s) in BPQ. Operation proceeds from step 1516 to step 1518, where the elements ms_reported is set to 1 for priority P and each of the priorities more significant than priority P. Next, in step 1520, the elements of ms_reported_cnt are set to 1 for priority P and each of the priorities more significant than P.

From step 1508, operation proceeds to step 1510, where the generate absolute request subroutine 328 returns an uplink traffic request representation to routine 324.

Figure 16:
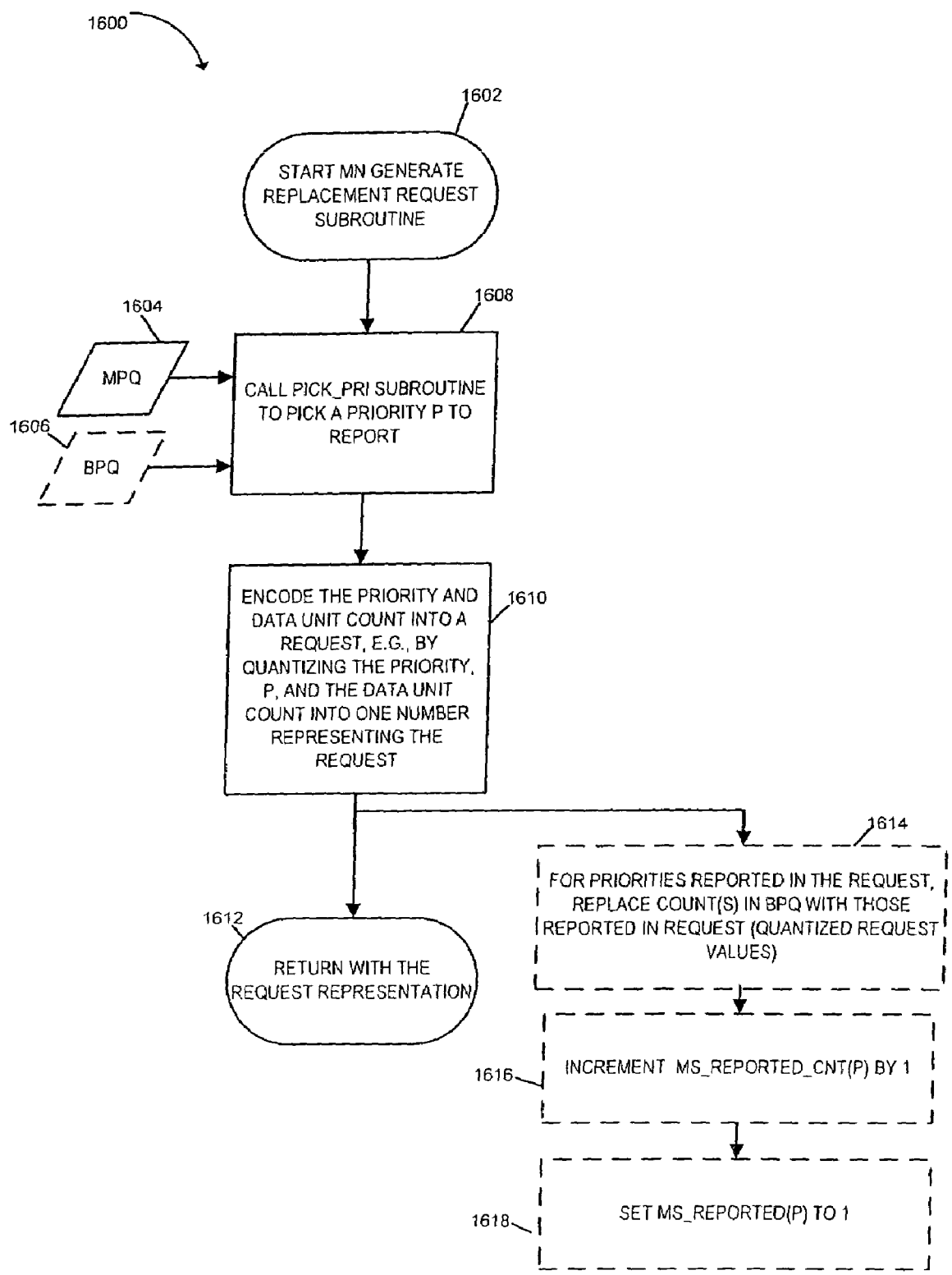
FIG. 16 shows a flowchart illustrating a method of a generate replacement request subroutine, of the present invention, that may be performed by a wireless terminal as part of the uplink resource request method.

FIG. 16 shows a flowchart 1600 illustrating the method of the mobile node's generate replacement request subroutine 330. Operation starts in step 1602 when the uplink resource request routine 324 calls the generate replacement request subroutine 330. Operation proceeds to step 1608, where subroutine 330 receives input, MPQ 1504, and, in some embodiments, BPQ 1606. In step 1608, a call is made to pick priority (pick_pri) subroutine 332 to pick to priority to report in the request. Various embodiments of the pick_pri subroutine are possible, in accordance the invention. In some embodiments, multiple priorities can be picked.

Next, in step 1610, the selected priority, designated as priority P, returned from the pick_pri subroutine 332, with its corresponding data unit count is in MPQ is encoded into a request, e.g., by quantizing the priority P and the data unit count into one number, e.g. a 6 bit representation, representing the request.

In embodiments using BPQ in the request generation, operation proceeds to step 1614. In step 1614, for the priorities reported in the request, the count(s) in BPQ are replaced by the count(s) reported in the request (quantized request values). Next in step 1616, the entry in ms_report_cnt corresponding to priority P, ms_report_cnt(P), is incremented by 1. Next, in step 1618, the flag identifying ms_reported for the priority P, ms_reported(P) is set to 1.

From step 1610, operation proceeds to step 1612, where the generate replacement request subroutine 330 returns an uplink traffic request representation to routine 324.

Figure 17:
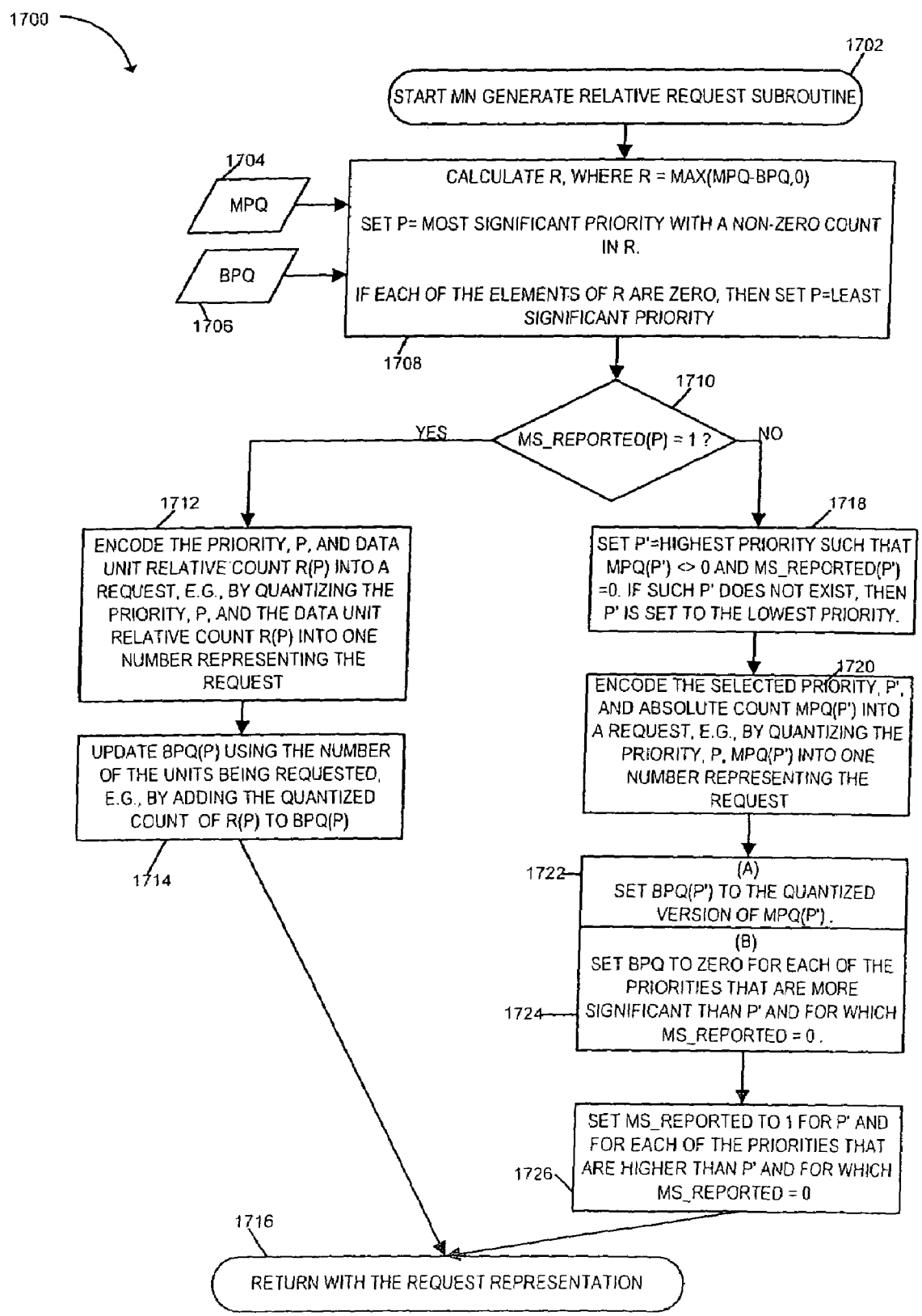
FIG. 17 shows a flowchart illustrating a method of a generate relative request subroutine, of the present invention, that may be performed by a wireless terminal as part of the uplink resource request method.

FIG. 17 shows a flowchart 1700 illustrating the method of the mobile node's generate relative request subroutine 334. Operation starts in step 1702 when the uplink resource request routine 324 calls the generate relative request subroutine 334. Operation proceeds to step 1708, where subroutine 334 receives inputs, MPQ 1704 and BPQ 1706. In step 1708, a vector R of priority difference levels is calculated, where R=max(MPQ-BPQ, 0). R is a relative difference between MPQ (mobile queue stats) and BPQ(the mobile's understanding of the base station's understanding of the MPQ) where the result is clamped to a lower value of zero. In some instances, the base station 200 may think the mobile 300 needs more data units than it actually needs at a particular priority level, e.g., due to an application in the mobile 300 dropping a previous request. In such a case, the R entry at that priority level is set to zero. In step 1708, the priority level P is set to the most significant priority with a non-zero count in its corresponding R element, if possible. This selects the most significant priority level at which resources are needed, where there is an imperfect understanding between MN 200 and BS 200. If however, each of the elements of R are zero, then P is set to the least significant priority.

Next, operation proceeds to step 1710, where ms_reported (P) is tested to see if it equals 1. This test of step 1710 checks to see if priority P has been requested before in the current group of requests. If the priority was previously reported in the GOR, operation proceeds to step 1712, otherwise operation proceeds to step 1718.

In step 1712, the priority P and the data unit relative count R(P) are encoded into a request, e.g., by quantizing the priority P and the data unit relative count R(P) into one number representing the request. Operation proceeds to step 1714, where BPQ(P) is updated using the number of the units being requested, e.g., by adding the quantized count of R(P) to BPQ(P). From step 1714, operation proceeds to step 1716.

If it was determined in step 1710 that priority level P had not been requested before in the current GOR, then operation proceeds to step 1718. In step 1718, P' is set to the highest priority such that MPQ(P')< >0 and ms_reported(P') equals zero. This identifies, the highest priority needing data units that has not previously requested in the current GOR. If no such P' exists, then P' is set to the lowest priority. Next in step 1720, the selected priority P' and the absolute count MPQ(P') is encoded into a request, e.g., by quantizing the priority, P' and number of data units MPQ(P') into one number representing the request. Then, in step 1722, part A of the BPQ update, BPQ(P') is set to the quantized version of MPQ(P'). In step 1724, part B of the BPQ update, each entry of BPQ is set to zero for each of the priorities that are more significant than P' and for which the corresponding priority level entry of ms_reported equals 0. Operation continues in step 1726, where the entries of ms_reported are set to 1 corresponding to priority P' and each of the priorities that are higher than P' and for which the corresponding priority level entry for ms_reported equals zero. From step 1726, operation proceeds to step 1716.

In step 1716, the generate relative request subroutine 334 returns the request representation, updated BPQ, updated ms_reported, and terminates.

Figure 18:
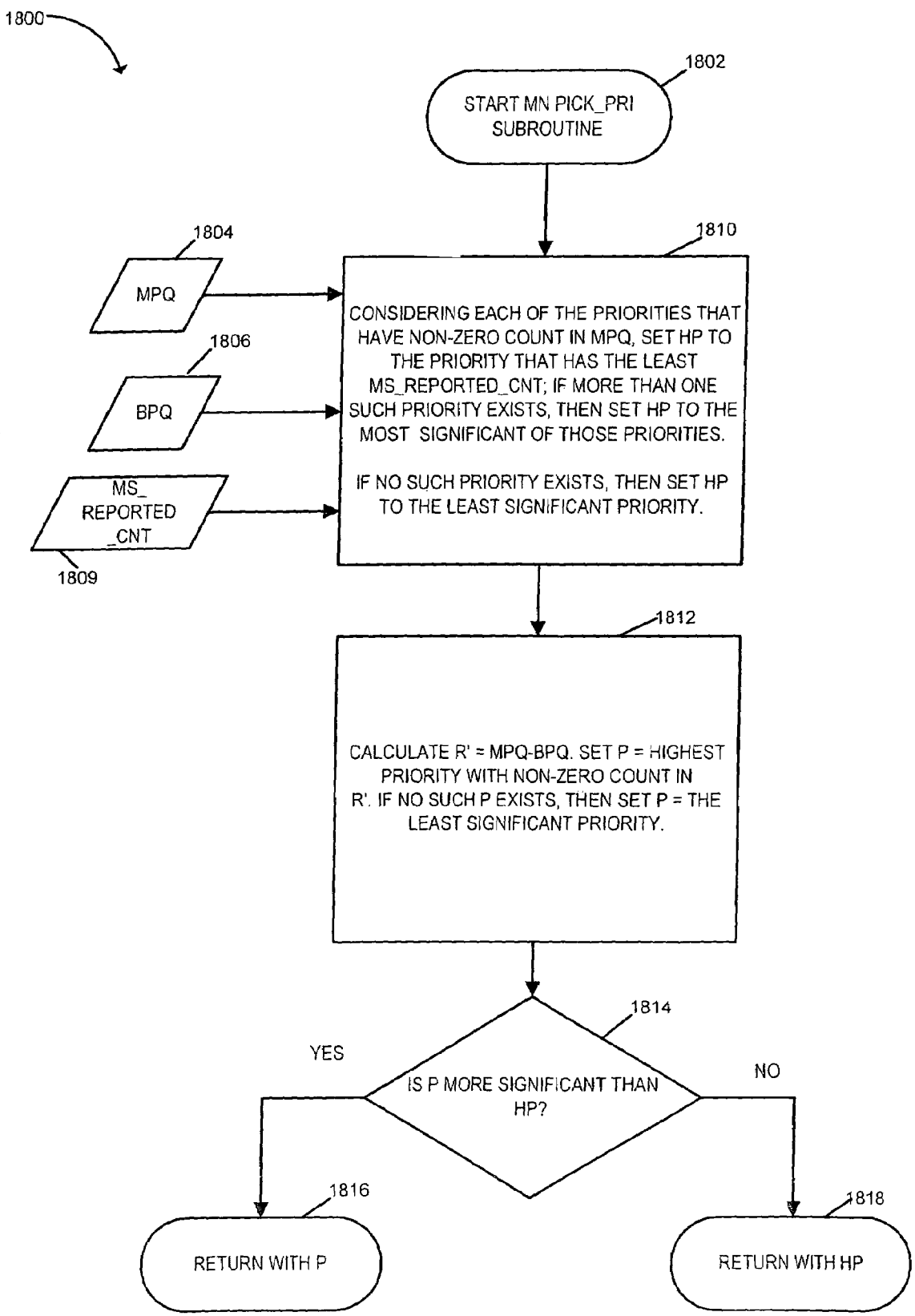
FIG. 18 show a flowchart illustrating a method of a pick_pri subroutine, of the present invention, that may be performed by a wireless terminal as part of the generate replacement request method.

FIG. 18 shows a flowchart 1800 illustrating an exemplary method that may be used in pick_pri subroutine 322. Operation starts in step 1802 when the generate replacement request subroutine 330 calls the pick_pri subroutine 322. Operation proceeds to step 1810, where MPQ 1804, BPQ 1806, and ms_reported_cnt 1808 are input. In step 1810, each of the priority levels that have non-zero counts in their corresponding MPQ entry are considered, and HP is set to the priority level that has the least ms_reported_cnt value. If more than one such priority level could be selected as HP, then HP is set to the most significant of those candidate HP priority levels. However, if there is no such priority that has non-zero counts in MPQ, then HP is set to the least significant priority. Operation proceeds to step 1812, where a vector R' is calculated, where R'=MPQ−BPQ. In step 1812, P is set to the highest priority with non-zero counts in an R' entry. P represents the highest priority in which the MN 300 thinks there is a misunderstanding between the base station and the MN 300. If no such P exists, then P is set equal to the least significant priority. Next, in step 1814, a comparison is made between the two priority level represented by the value of P and the value of HP. If priority level P is more significant than priority level HP, then the priority level represented by P is returned from pick_pri subroutine 322 to be used as the picked priority level in generate replacement request subroutine 330; otherwise, the priority level represented by HP is returned from pick_pri subroutine 322 to be used as the picked priority in generate replacement request subroutine 330.

In more concrete terms, the method outlined above to compute HP can be given as:

```
BEGIN
HP = LEAST SIGNIFICANT PRIORITY
MIN_RCNT = SOME HUGE NUMBER
    (greater than highest possible value of any element of
```

-continued

```
    MS_REPORTED_CNT, SAY 1000)
FOR I = MOST SIGNIFICANT THROUGH LEAST SIGNFICANT
PRIORITY IN THAT ORDER
    IF (MPQ(I) > 0) AND (MS_REPORTED_CNT(I) < MIN_RCNT)
        HP = I;
        MIN_RCNT = MS_REPORTED_CNT(I);
    ENDIF
ENDFOR
END.
```

Other embodiments of the pick_pri subroutine 322 are possible. For example, it would be possible to pick priorities in a round robin fashion across the requests. Another example is one in which the wireless terminal uses a number of most recent previous requests and its current queue information to pick the priority to be requested.

The present invention will be better understood if further explained in the context of some examples such as the ones shown in FIGS. 19-23.

In accordance with the invention, in some embodiments, data units, e.g., frames, to be transmitted by a wireless terminal (WT) are classified as belonging to various MAC (medium access control) streams. The set of streams is partitioned into non-overlapping stream priority groups, and traffic corresponding to streams within the same stream priority group are aggregated for reporting to the BS. Thus in one exemplary embodiment, the traffic at an WT is classified into 16 streams (0 through 15), and streams are partitioned into 4 priority groups (0 through 3) as follows: streams 0 and 1 belong to priority group 0, streams 2 and 3 to group 1, streams 4 and 5 to group 2, and streams 6 through 15 to group 3. The frames belonging to streams 0 and 1 are summed to get the frames of priority group 0, frames belonging to streams 6 through 15 are summed to get the frames belonging to priority group 3, etc.

Table 2300 shown in FIG. 23 is suitable for use as a mapping table when forming uplink assignment requests at the WT and interpreting such requests at the BS. The array thre is given by thre=[1, 2, 3, 4, 8, 16, 25, 65]. In this example, each transmitted request includes 5 bits. Each transmitted request listed in the first column 2301 reports information about one stream priority which is listed the second column 2302. This mapping table 2300 is used to implement quantization in the WT and to perform dequantization, e.g., decoding, in the BS. The third column 2304 labeled "n at MS" lists the range of the number of frames (n) at that priority for the WT to make the request listed in column 2301 of the corresponding row. The "n at BS" column 2306 shows how the BS will interpret the 5 bit request listed in column 2401. Thus, if the WT has 20 frames of priority 3, and no other traffic, it will request R0=29. The BS will interpret this to mean 16 (=thre[5]) frames of priority 3. Thus, the actual value of 20 frames is quantized to 16 frames when the table 2300 is used.

Figure 19:
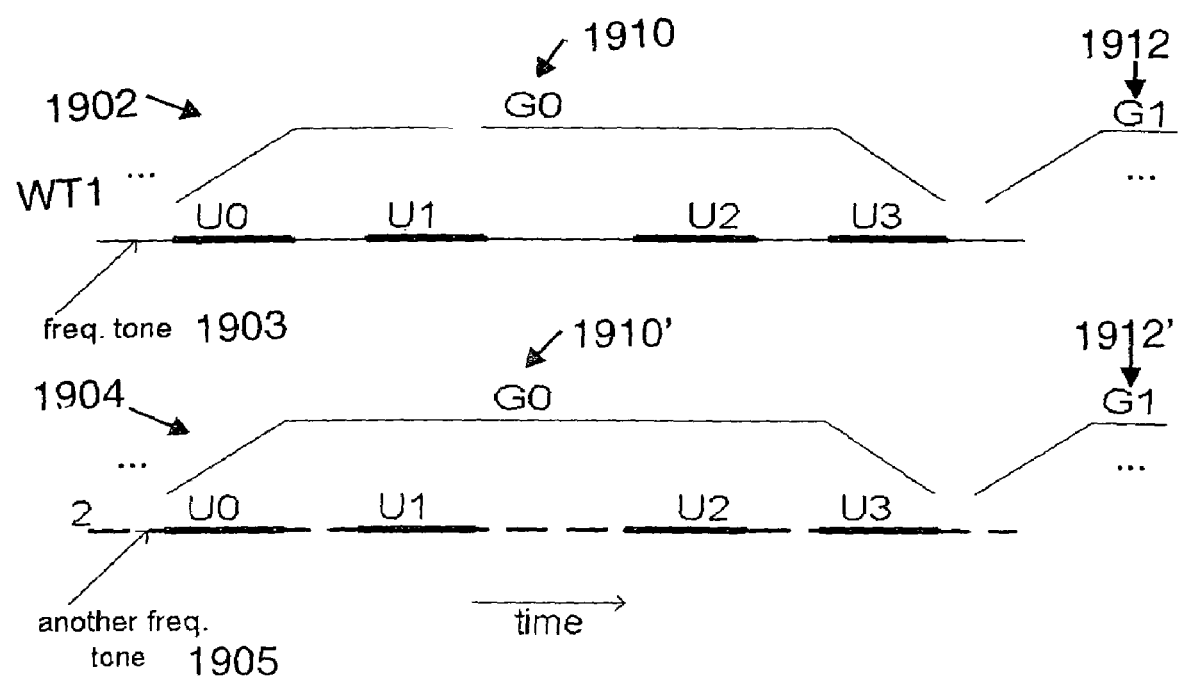
FIG. 19 shows various request channels which can be used in accordance with the present invention.

Referring now to FIG. 19, various request channels which can be used in accordance with the invention are shown. WT traffic information is conveyed on a dedicated and contention-free channel, so that the information, e.g., uplink transmission resource requests, can be conveyed often without overhead of control messages or packet headers. Dedicated implies each active WT in the cell has an opportunity to convey traffic information periodically and/or very frequently, e.g., multiple times within a relatively short time period, e.g., a time period less than 98 ms in duration, and that this information allows for a high degree of resiliency.

Contention-free implies that the BS will knows from when and on which tone it receives the information which WT the request information corresponds to. Accordingly, WT identifier information need not be specified in the request. In one embodiment, shown in FIG. 19, each WT (WT1, WT2) has one frequency tone 1902, 1904 dedicated to it, and periodic time slices (U0, U1, U2, U3, . . . ) on this tone 1902, 1904 (per mobile) are used to convey uplink requests.

The exemplary method is used for each WT to convey its particular traffic information (henceforth, we will use the term Q-stats for traffic information) to the BS. The dedicated resource for conveying the Q-stats is divided into units each representing an opportunity for the WT to convey its Q-stats. Let these units be denoted by U0, U1, U2, . . . respectively as shown in FIG. 19. This sequence of units is partitioned into groups (say G0 1910, 1910', G1 1912, 1912', . . . ) in a time-sequential order, where each group is a group of requests (GOR) which are used to request uplink resources, e.g., the right to transmit data units corresponding to various transmission priority levels. In the particular exemplary embodiment shown in FIG. 19, each group Gi includes four request units (e.g., G0 includes of U0, U1, U2, and U3; G1 includes U4 through U7, etc.) where each request unit is used to transmit one uplink traffic resource allocation request. Each request may include a request for data units corresponding to one or multiple priority levels. Different numbers of data units may be requested for different priority levels in some embodiments. The number of requested data transmission units may be a quantized value which is the same as or close to the actual number of transmission units required by a base station. In another embodiment each group includes just one unit.

The invention discloses a method for the BS to interpret the uplink requests from the WT. The BS is aware of the partitioning of the dedicated resource for conveying uplink requests into units U0, U1, U2, . . . , and grouping of these units into groups G0, G1, G2, . . . , etc.

Upon receiving an uplink request from the WT, the BS knows about the group to which the request belongs and the unit within the group that the request corresponds to. Requests within a group can be of a pre-selected type, e.g., absolute, relative or replacement. Upon receiving the request, the BS follows a three-step procedure to update its current knowledge (bsQ) of WT Q-stats:

1. In accordance with the invention, in the first step, the BS updates bsQ to bring bsQ to the same logical point at which the WT made the request. This involves moving backwards in time to update bsQ to account for all the assignments made after the WT formed the request and before the BS received the request. The BS can figure out the logical point at which the WT formed the request because there is a fixed delay between the WT forming a request and the BS receiving it, and this delay can be predetermined. The assignments (and the BS's understanding of how the WT distributes those assignment across the stream priority groups) made by the BS during this delay period are stored at the BS in an assignment pipeline.
2. In the second step, the BS updates bsQ depending on the information contained in the request, and possibly also depending on information contained in previous requests belonging to the same group. In one embodiment, the BS uses an inverse mapping of the mapping used at the WT to obtain the number of frames and their priorities reported in the request. In another embodiment, this may not be an exact inverse mapping (say, depending on conservative or aggressive interpretation of the request). This number of frames is then added or replaced in bsQ at the corresponding stream priorities depending on whether the request contains absolute or relative information regarding those stream priorities.
3. In the third step, the BS updates bsQ to bring it back to the current time. This involves moving forward in time to update bsQ to account for all the assignments made after the WT formed the request and before the BS received the request (this step is the reverse of Step 1). In this step, the BS also updates the BS's understanding (stored in the assignment pipeline) of how the assignments were distributed by the WT across the stream priority groups.

Consider for example, the $i^{th}$ group Gi (for any i), and let the units within this group be Ui0, Ui1, Ui2, Ui3, . . . , UiNi (i.e., there are Ni units in group Gi). We will assume that the stream priority groups are ordered in non-increasing order of significance (priority) with stream priority 0 representing the priority group of highest significance. Q-stats will refer to the vector of number of frames in each stream priority group in the example. We further assume that when the WT receives an assignment of n frames from the BS, in this example, the WT distributes these n frames (data units) to the various stream priorities in their order of significance, and updates its Q-stats (msQ) by subtracting the corresponding number of frames from those stream priorities. A similar update of bsQ takes place at the BS upon making an assignment.

Let us now consider an exemplary embodiment where absolute requests are used and relative requests are not used. One such example will be shown in FIGS. 20-21 which will be used to explain how an exemplary BS implemented in accordance with the invention interprets an exemplary request R0. We shall consider the case where we have two stream priority groups (0 and 1 respectively). In an array [A B], A is used to refer to the number of data transmission units corresponding to priority group 0 while B is used to refer to the number of data transmission units corresponding to priority 1.

Figure 20:
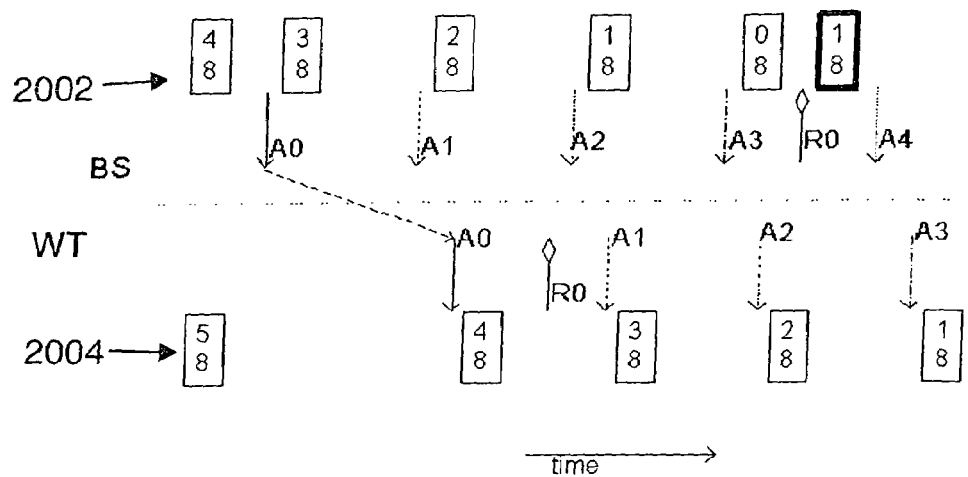
FIG. 20 shows exemplary BS Q-stats and WT Q-stats as they change with time and exemplary requests and assignments in accordance with the present invention.
Figure 21:
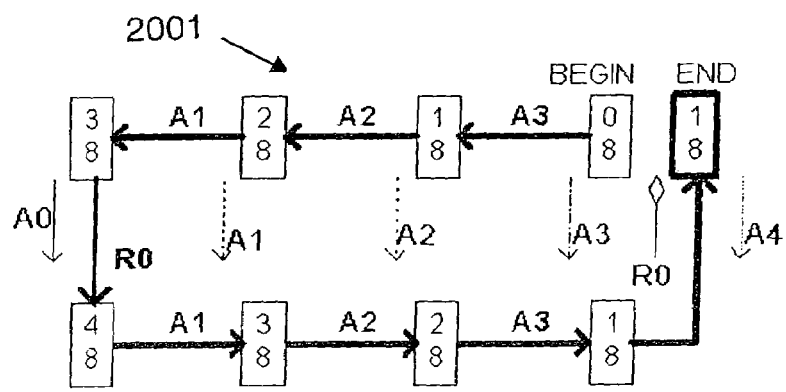
FIG. 21 is a flow diagram showing changes in Q stats at the base station which occur as requests are processed and assignments are generated, in accordance with the invention.

In FIG. 20, row 2002 shows exemplary BS Q-stats while row 2004 shows exemplary WT stats as they change with the passage of time as represented from left to right. Suppose the BS's understanding of WT Q-stats is bsQ=[4 8], and that the actual Q-stats at the WT is msQ=[5 8] (perhaps because of an arrival of 1 frame of stream priority 0). Suppose the WT receives an assignment A0 of 1 frame (for this illustration all assignments are for 1 frame) so that msQ becomes [4 8] as illustrated in FIG. 21 (a similar update takes place at BS after making assignment A0). After this the mobile gets a chance to report its Q-stats to the BS. Since the mobile has limited number of bits to convey this info, in some embodiments, the WT conveys a quantized version, say [4 x], to the BS (i.e., 4 frames of priority 0, and nothing is said about priority 1). Let's denote this request by R0=[4 x]. How does the BS interpret R0? If the BS received and interpreted R0 instantly, then BS could simply replace the Q-stats it has with R0. In reality, several slots (known and determined beforehand) elapse between WT forming the request R0 and BS actually interpreting R0. This is due to FPGA and mux/demux delays at WT/BS, and transmission time over the air. Because of this delay, it is possible that the BS makes several assignments (based on the BS's current knowledge of Q-stats) before reading R0, but the WT may not have read the latest of these assignments before making the request R0.

Thus, in the figure, the BS has made assignments A0-A3 before reading R0 but the WT read only A0 before forming request R0.

Each time the WT acts upon an assignment, or drops a frame, the number of frames that the WT has to transmit is reduced and its Q-stats are updated. Similarly, every time the BS makes an assignment, the BS updates its copy of the WT Q-stats. Due to the delays, these Q-stats updates at WT and BS are asynchronous. Indeed, when the BS begins to interpret R0, BS has already updated its Q-stats to account for the preceding assignments (A0-A3 shown in FIG. 20). On the other hand, when the WT formed request R0, the WT may not even have received some of these assignments (WT received only A0 in figure). Therefore, if the BS simply replaced its most current copy of Q-stats by R0, this may be inconsistent with the update taking place at the WT (this would be equivalent to assuming that the WT had acted upon all the assignments that the BS made before the BS received R0).

Assuming no arrivals or drops at the WT after making request R0, the Q-stats at the WT and BS should become consistent (within limits of quantization) after the BS reads R0. bsQ before reading R0 is [0 8]. This is after the BS has updated the Q-stats for the latest assignment preceding R0 which is A3. At the WT, we see that the Q-stats is [1 8] after reading assignment A3 (assuming no arrivals). To have consistency between the WT and BS, we expect the BS to be able to correct its Q-stats to [1 8] after reading R0=[4 x].

FIG. 21 is a flow diagram 2001 showing changes in Q stats at the BS which occur as requests are processed and assignments generated as shown in FIG. 20. FIG. 21 represents a processing pipeline that is used to update the Q-stats at the BS for a WT which sent a request.

Consider the Go Back step at the BS. In the FIGS., A3, A2, and A1 are the assignments that the WT did not receive before making request R0. These assignments are stored at the BS in an assignment pipeline. The length (number of assignments) of this pipeline depends on the delay between the WT forming a request and the BS interpreting it. The delay will be known since it is a fixed value corresponding to known signal timing. Thus, the length of the pipeline is predetermined. In the FIG. 21, the BS begins with bsQ=[0 8] (Q-stats at BS when it receives R0). The BS then adds the frames assigned (to various stream priorities) in A3 to figure out its Q-stats (=[1 8]) before making assignment A3. Before A2, it was [2 8], and before A1 it was [3 8], i.e., the Q-stats at BS after making assignment A0 was bsQ=[3 8].

Now consider the Replace step at BS. In the figure, the request R0 from the WT tells the BS that the Q-stats at the WT after reading A0 was msQ=[4 x]. Since bsQ and msQ now refer to the same logical point at the BS and WT, they should be consistent. Thus, the BS updates bsQ to [4 8] (the 8 frames of priority 1 are left untouched since the WT did not give any information regarding them).

In the Go Forward step, the BS moves past the assignments A1-A3 to arrive at its current understanding of Q-stats. In this step, the BS mimics the WT. BS starts with bsQ=[4 8] arrived at in the Replace step. Then it knows that n (=1 for our illustration) frames were assigned in A1. BS distributes these n frames across the various stream priorities just as the WT would. This allows the BS to update bsQ (to [3 8] in figure), and also tells the BS how the n frames were distributed across the various priorities. The later information is used to update A1 itself in the pipeline. This is because the assignment A1 may have been used differently by the WT than what the BS thought (e.g., on the WT some more significant priority traffic arrives of which the BS becomes aware only after receiving R0. The update of A1 will serve to reflect this). It is important to write back this updated A1 in the assignment pipeline at the BS to ensure correct updates when the next request is read by the BS. Similarly, the BS moves past assignments A2 and A3 to arrive at its current Q-stats of [1 8]. In the example, this is consistent with the Q-stats at the WT after the WT receives assignment A3.

Figure 22:
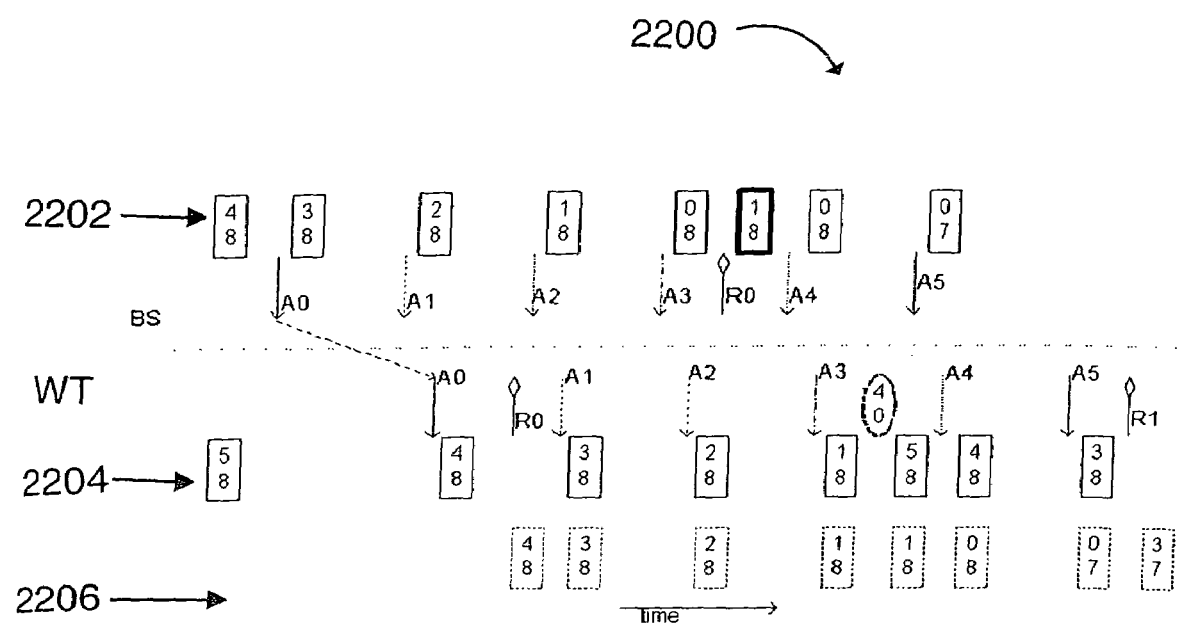
FIG. 22 shows signaling and processing corresponding to an embodiment of the invention which uses relative requests.

Now let us consider FIG. 22 which shows signaling and processing 2200 corresponding to an embodiment which uses relative requests. Row 2202 shows the BS's estimate of the queue status at the WT. Row 2204 corresponds to WT actual queue status while row 2206 shows the WT's estimate of the BS's estimate of the WT's queue status 2204. The relative requests include an absolute value the first time a request corresponding to a particular priority level is made in a group of request with relative values being used for requests correspond to the same priority level subsequently.

In FIG. 22, after sending absolute request R0, the WT knows how the BS will interpret R0. The WT keeps a copy (msBsQ) of this understanding of the BS's knowledge of WT Q-stats. The content of msBsQ is shown in the last row of the figure as dashed boxes. Thus after sending R0=[4 x ], msBsQ=[4 8] (this could also have been say [4 3] depending on how much information about priority 1 traffic has been conveyed to the BS in the past). Then the WT updates msBsQ as each assignment (of which the BS is also aware) is received. Thus after receiving the five assignments A1-A5, msBsQ becomes [4 8]-5 frames=[0 7] (this is not affected by the arrival of 4 frames shown in the oval box). The WT knows that the BS would have followed the same process to update bsQ after each assignment. In the figure, we see that msBsQ and bsQ match after making assignment A5. The WT constructs R1 by comparing msQ (boxes in middle row) to msBsQ (dashed boxes in last row). Let R=msQ−msBsQ=[3 8]−[0 7]=[3 1]. The most significant priority in R with non-zero frames is p=0. Since p=0 has already been reported in R0, R1 is formed as quantized version of R which is (assuming all 3 frames of p=0 can be represented) R1=[3 x].

When the BS receives R1, it first restores the Q-stats to those just after assignment A5 (using the assignment pipeline) with the same procedure as in the basic scheme. This would be [0 7] in our example. This is then corrected using R1. R1 reports frames of priority p=0. Since p=0 has already been reported in R0, this is a relative request for priority p=0. This involves addition so that the corrected Q-stats at BS become [3 7] (the WT also carries out this computation so that msBsQ=[3 7] after sending R1). The BS then moves past any further assignments (that the WT did not receive yet) that it may have made to arrive at its current understanding of MS Q-stats.

The methods and apparatus of the invention may be used to implement a wide range of communication systems including OFDM systems, CDMA systems, etc.

Machine readable media, e.g., memory, including one or more routines having executable instructions which cause a device to perform one or more steps in accordance with the invention, are one aspect to which the present invention is directed.

What is claimed is:

1. A method of operating a wireless communications device, comprising:
maintaining a first set of queue information indicating for each of a plurality of different transmission priority levels a number of data units to be transmitted;
maintaining a second set of queue information indicating for each of said plurality of different transmission priority levels an estimate of a base station's estimate of the first set of queue information maintained by said wireless communications device; and periodically generating a group of transmission requests over time as a function of said maintained queue information, said group of transmission requests including:

a first transmission request specifying an absolute number of data units to be transmitted for a first one of said plurality of different transmission priority levels.

2. The method of claim 1, wherein said group of transmission requests further includes:

a second transmission request.

3. The method of claim 2, wherein said first transmission request is located at a pre-selected position within said group of requests, said step of generating said group of requests including:

incorporating in the first transmission request, as said absolute number, a number of data units to be transmitted corresponding to the highest transmission priority level having a non-zero number of data units to be transmitted, as indicated by said set of queue information.

4. The method of claim 3, wherein generating said group of transmission requests includes:

incorporating a second number of data units to be transmitted corresponding to another transmission priority level, into said first transmission request.

5. The method of claim 2, wherein said second transmission request includes a relative value indicating a relative number of data units corresponding to one of said plurality of different transmission priority levels to be transmitted.

6. The method of claim 5, wherein said relative value is relative to an estimate of a base station estimate of a value in the first queue information maintained by said wireless communications device.

7. The method of claim 2, wherein said second transmission request includes a relative value indicating a relative number of data units corresponding to one of said plurality of different transmission priority levels to be transmitted.

8. The method of claim 7, wherein said relative value is generated as a function of a difference between the number of data units in the first and second sets of queue information corresponding to said one of said plurality of different transmission priority levels.

9. The method of claim 8, wherein said absolute value is generated using a first quantization table; and wherein said relative value is generated using a different quantization table including a different number of quantization levels than said first quantization table.

10. The method of claim 2, wherein said wireless communications device determines the priority level for which data unit information is to be included in at least one of said first and second transmission requests as a function of values included in both said first and second sets of queue information.

11. The method of claim 5, wherein said group of transmission requests includes more requests including relative values than requests including absolute numbers of data units to be transmitted for one of said plurality of different transmission priority levels.

12. The method of claim 1, wherein the first and second transmission requests include different numbers of bits, the first transmission request including at least twice the number of bits as a second transmission request which follows said first transmission request.

13. The method of claim 1, wherein each group of transmission requests includes at least three requests, the method further comprising:

transmitting each group of requests in a time period less than 98 milli-seconds in duration.

14. The method of claim 1, further comprising:

transmitting a first transmission request to a base station at a first point in time;

discarding data corresponding to said first one of said plurality of different transmission priority levels prior to receiving a signal indicating that said first transmission request was granted;

updating said first set of queue information to reflect the discarding of data corresponding to the first one of said plurality of different transmission priority levels; and transmitting said second transmission request at a second point in time, said second point in time following said updating of said first set of queue information to reflect the discarding of data.

15. A wireless communications device, comprising:

a first set of queue information indicating for each of a plurality of different transmission priority levels a number of data units to be transmitted; and means for periodically generating a group of transmission requests over time as a function of said first set of queue information, said group of transmission requests including:

i) a first transmission request specifying an absolute number of data units to be transmitted for a first one of said plurality of different transmission priority levels and a second number of data units to be transmitted, said second number of data units corresponding to another transmission priority level which is different from said first one of said plurality of different transmission priority levels; and ii) a second transmission request.

16. The wireless communications device of claim 15, wherein said first transmission request is located at a pre-selected position within said group of transmission requests, said means for periodically generating a group of transmission requests including:

means for incorporating in the first transmission request, as said absolute number, the number of data units to be transmitted corresponding to the highest transmission priority level having a non-zero number of data units to be transmitted as indicated by said set of queue information.

17. The wireless communications device of claim 15, further comprising:

a second set of queue information indicating for each of said plurality of different transmission priority levels an estimate of a base station's estimate of the first set of queue information maintained by said wireless communications device.

18. The wireless communications device of claim 17, further comprising:

memory for storing said first and second transmission requests prior to transmission, said second transmission request including a relative value indicating a relative number of data units corresponding to one of said plurality of different transmission priority levels to be transmitted.

19. The wireless communications device of claim 18, wherein said relative value is relative to a number of data units in said second set of queue information corresponding to said one of said plurality of different transmission priority levels.

20. The wireless communications device of claim 17, further comprising:
   memory for storing said second transmission request, said second transmission request including a relative value indicating a relative number of data units corresponding to one of said plurality of different transmission priority levels to be transmitted.

21. The wireless communications device of claim 20, wherein said means for periodically generating a group of transmission requests generates said relative value as a function of a difference between the number of data units in the first and second queues corresponding to said one of said plurality of different transmission priority levels.

22. The wireless communications device of claim 21, further comprising
   a first quantization table used to generate said absolute value; and
   a second quantization table including a different number of quantization levels than said first quantization table, said second quantization table being used to generate said relative value.

23. The wireless communications device of claim 17, wherein said wireless communications device includes means for determining the transmission priority level for which said data unit information is to be included in one of said first and second transmission requests as a function of the values included in both said first and second sets of queue information.

24. The wireless communications device of claim 18, wherein said group of transmission requests includes more transmission requests including relative values than transmission requests including absolute values.

25. The wireless communications device of claim 15, wherein the first and second transmission requests include different numbers of bits, the first transmission request including at least twice the number of bits as a second transmission request which follows said first transmission request.

26. A method of operating a base station to allocate uplink channel communications resources in a multiple access system where multiple wireless terminals can request uplink channel communication resources from said base station, the method comprising:
   maintaining a set of queue information indicating, for each wireless terminal requesting data units which have not yet been allocated as requested, the requested number of data units for each priority level for which an unsatisfied data unit request was received;
   monitoring to receive uplink channel resource requests from any one of said wireless terminals;
   in response to a received resource allocation request including at least one of an absolute number of requested data units and a relative number of requested data units corresponding to one of a plurality of different transmission priority levels,
      i) performing a queue information update operation, wherein said queue information update operation includes adding the number of data units corresponding to one of said plurality of different transmission priority levels in said set of queue information with the requested number of data units specified in the received request; and
      ii) allocating uplink channel resources as a function of the updated queue information.

27. The method of claim 26, wherein updating said queue information includes generating updated requested numbers of data units for said one of said plurality of different transmission priority levels as a function of L most recent assignments made by said base station where L is a known value at the time said request is received, L being a positive integer.

28. The method of claim 27, wherein said step of generating updated requested numbers of data units as a function of the most recent L assignments includes accessing memory storing assignment information as a vector including a mobile node identifier, a plurality of transmission priority levels and, for each transmission priority level, an assigned number of data units.

29. The method of claim 27, wherein updating said queue information includes replacing a number of data units, corresponding to one of said plurality of different transmission priority levels, in said set of queue information with a requested number of data units corresponding to said one of said plurality of different transmission priority levels, said requested number of data units being an absolute value communicated by said received request.

30. The method of claim 29, further comprising:
   setting the number of data units corresponding to transmission priority levels which have a higher transmission priority than said one of said plurality of different transmission priority levels to zero.

31. The method of claim 27, wherein updating said queue information includes:
   subtracting at least some numbers of assigned data units in the L assignments to values included in said set of queue information.

32. The method of claim 27, wherein updating said queue information includes:
   adding at least some numbers of assigned data units in the L assignments to values included in said set of queue information.

33. A base station for allocating uplink channel communications resources in a multiple access system where multiple wireless terminals can request uplink channel communication resources from said base station, the base station comprising:
   a set of queue information indicating, for each wireless terminal requesting data units which have not yet been allocated as requested, the requested number of data units for each priority level for which an unsatisfied data unit request was received;
   a receiver for receiving uplink channel resource requests from any one of said wireless terminals;
   a module for performing a queue information update operation in response to a received resource allocation request including at least one of an absolute number of requested data units and a relative number of requested data units corresponding to one of a plurality of different transmission priority levels, said module for performing a queue information update operation including a module for adding a requested number of data units corresponding to one of said plurality of different transmission priority levels in said set of queue information with a requested number of data units specified in the received request; and
   an uplink resource allocation module for allocating uplink channel resources as a function of the updated queue information and said received resource allocation request.

34. The base station of claim 33, wherein said module for performing a queue information update operation includes:
   means for generating updated requested numbers of data units for said one of said plurality of different transmission priority levels as a function of L most recent assignments made by said base station where L is a known value at the time said request is received.

35. The base station of claim 34, wherein said module for performing a queue update operation further includes:
means for replacing a requested number of data units, corresponding to one of said plurality of different transmission priority levels, in said set of queue information with a requested number of data units corresponding to said one of said plurality of different transmission priority levels, said requested number of data units being an absolute value communicated by said received request.

36. The base station of claim 35, wherein said module for performing a queue update operation further includes:
means for setting requested numbers of data units corresponding to priority levels which have a higher priority than said one of said plurality of different transmission priority levels to zero.

37. An apparatus comprising:
a processor configured to implement a communications method, the method comprising:
maintaining a first set of queue information indicating for each of a plurality of different transmission priority levels a number of data units to be transmitted;
maintaining a second set of queue information indicating for each of said plurality of different transmission priority levels an estimate of a base station's estimate of the first set of queue information maintained by a wireless communications device; and
periodically generating a group of transmission requests over time as a function of said maintained queue information, said group of transmission requests including:
a first transmission request specifying an absolute number of data units to be transmitted for a first one of said plurality of different transmission priority levels.

38. The apparatus of claim 37, wherein said group of transmission requests further includes:
a second transmission request.

39. The apparatus of claim 38, wherein said first transmission request is located at a pre-selected position within said group of requests, the step of generating said group of requests further including:
incorporating in the first transmission request, as said absolute number, a number of data units to be transmitted corresponding to the highest transmission priority level having a non-zero number of data units to be transmitted, as indicated by said set of queue information.

40. A computer readable medium embodying computer executable instructions for controlling a wireless communications device to implement a method, the method comprising:
maintaining a first set of queue information indicating for each of a plurality of different transmission priority levels a number of data units to be transmitted;
maintaining a second set of queue information indicating for each of said plurality of different transmission priority levels an estimate of a base station's estimate of the first set of queue information maintained by said wireless communications device; and
periodically generating a group of transmission requests over time as a function of said maintained queue information, said group of transmission requests including:
a first transmission request specifying an absolute number of data units to be transmitted for a first one of said plurality of different transmission priority levels.

41. The computer readable medium of claim 40, wherein said group of transmission requests further includes:
a second transmission request.

42. The computer readable medium of claim 41, wherein said first transmission request is located at a pre-selected position within said group of requests, the step of generating said group of requests further including:
incorporating in the first transmission request, as said absolute number, a number of data units to be transmitted corresponding to the highest transmission priority level having a non-zero number of data units to be transmitted, as indicated by said set of queue information.

43. A wireless communications device, comprising:
a memory device including a first set of queue information indicating for each of a plurality of different transmission priority levels a number of data units to be transmitted; and
a transmission request generation module for periodically generating a group of transmission requests over time as a function of said first set of queue information, said group of transmission requests including:
i) a first transmission request specifying an absolute number of data units to be transmitted for a first one of said plurality of different transmission priority levels and a second number of data units to be transmitted, said second number of data units corresponding to another transmission priority level which is different from said first one of said plurality of different transmission priority levels; and
ii) a second transmission request.

44. The wireless communications device of claim 43, wherein said first transmission request is located at a pre-selected position within said group of transmission requests, said transmission request generation module for periodically generating a group of transmission requests including:
a module for incorporating in the first transmission request, as said absolute number, the number of data units to be transmitted corresponding to the highest transmission priority level having a non-zero number of data units to be transmitted as indicated by said set of queue information.

45. An apparatus comprising:
a processor configured to control a base station to implement a method of allocating uplink channel communications resources in a multiple access system where multiple wireless terminals can request uplink channel communication resources from said base station, the method comprising:
maintaining a set of queue information indicating, for each wireless terminal requesting data units which have not yet been allocated as requested, the requested number of data units for each priority level for which an unsatisfied data unit request was received;
monitoring to receive uplink channel resource requests from any one of said wireless terminals;
in response to a received resource allocation request including at least one of an absolute number of requested data units and a relative number of requested data units corresponding to one of a plurality of different transmission priority levels,
i) performing a queue information update operation, wherein said queue information update operation includes adding the number of data units corresponding to one of said plurality of different transmission priority levels in said set of queue information with the requested number; and ii) allocating uplink channel resources as a function of the updated queue information.

46. The apparatus of claim 45,
wherein updating said queue information includes generating updated requested numbers of data units for said one of said plurality of different transmission priority levels as a function of L most recent assignments made by said base station where L is a known value at the time said request is received, L being a positive integer.

47. The apparatus of claim 46, wherein said step of generating updated requested numbers of data units as a function of the most recent L assignments includes accessing memory storing assignment information as a vector including a mobile node identifier, a plurality of transmission priority levels and, for each transmission priority level, an assigned number of data units.

48. A computer readable medium embodying computer executable instructions for controlling a base station to implement a method of allocating uplink channel communications resources in a multiple access system where multiple wireless terminals can request uplink channel communication resources from said base station, the method comprising:
maintaining a set of queue information indicating, for each wireless terminal requesting data units which have not yet been allocated as requested, the requested number of data units for each priority level for which an unsatisfied data unit request was received;
monitoring to receive uplink channel resource requests from any one of said wireless terminals;
in response to a received resource allocation request including at least one of an absolute number of requested data units and a relative number of requested data units corresponding to one of a plurality of different transmission priority levels,
 i) performing a queue information update operation, wherein said queue information update operation includes adding the number of data units corresponding to one of said plurality of different transmission priority levels in said set of queue information with the requested number; and
 ii) allocating uplink channel resources as a function of the updated queue information.

49. The computer readable medium of claim 48,
wherein updating said queue information includes generating updated requested numbers of data units for said one of said plurality of different transmission priority levels as a function of L most recent assignments made by said base station where L is a known value at the time said request is received, L being a positive integer.

50. The computer readable medium of claim 49, wherein said step of generating updated requested numbers of data units as a function of the most recent L assignments includes accessing memory storing assignment information as a vector including a mobile node identifier, a plurality of transmission priority levels and, for each transmission priority level, an assigned number of data units.

51. A base station for allocating uplink channel communications resources in a multiple access system where multiple wireless terminals can request uplink channel communication resources from said base station, the base station comprising;
information storage means for storing a set of queue information indicating, for each wireless terminal requesting data units which have not yet been allocated as requested, the requested number of data units for each priority level for which an unsatisfied data unit request was received;
receiver means for receiving uplink channel resource requests from any one of said wireless terminals;
means for performing a queue information update operation in response to a received resource allocation request including at least one of an absolute number of requested data units and a relative number of requested data units corresponding to one of a plurality of different transmission priority levels, said means for performing a queue information update operation including a module for adding a requested number of data units corresponding to one of said plurality of different transmission priority levels in said set of queue information with a requested number of data units specified in the received request; and
means for allocating uplink channel resources as a function of the updated queue information and said received resource allocation request.

52. The method of claim 2, further comprising:
incorporating a second number of data units to be transmitted, corresponding to a second one of said plurality of different transmission priority levels, into said first transmission request; and
wherein said second transmission request includes a relative value indicating a relative number of data units corresponding to one of said plurality of different transmission priority levels to be transmitted.

* * * * *